(12) United States Patent
Zhang et al.

(10) Patent No.: US 10,901,437 B2
(45) Date of Patent: Jan. 26, 2021

(54) UNMANNED AERIAL VEHICLE INCLUDING AN OMNIDIRECTIONAL DEPTH SENSING AND OBSTACLE AVOIDANCE AERIAL SYSTEM AND METHOD OF OPERATING SAME

(71) Applicant: Hangzhou Zero Zero Technology Co., Ltd., Zhejiang (CN)

(72) Inventors: Tong Zhang, Zhejiang (CN); Lei Zhang, Zhejiang (CN); Zhaozhe Wang, Zhejiang (CN); Xi Zhang, Zhejiang (CN); Mengwen Tan, Zhejiang (CN)

(73) Assignee: Hangzhou Zero Zero Technology Co., Ltd., HangZhou (CN)

( * ) Notice: Subject to any disclaimer, the term of this patent is extended or adjusted under 35 U.S.C. 154(b) by 160 days.

(21) Appl. No.: 16/265,707

(22) Filed: Feb. 1, 2019

(65) Prior Publication Data

US 2019/0243388 A1  Aug. 8, 2019

Related U.S. Application Data

(60) Provisional application No. 62/627,276, filed on Feb. 7, 2018.

(51) Int. Cl.
*G05D 1/10* (2006.01)
*B64D 47/08* (2006.01)
(Continued)

(52) U.S. Cl.
CPC .......... *G05D 1/101* (2013.01); *B64C 39/024* (2013.01); *B64D 47/08* (2013.01);
(Continued)

(58) Field of Classification Search
CPC ..................................................... G05D 1/102
See application file for complete search history.

(56) References Cited

U.S. PATENT DOCUMENTS

| 9,703,288 B1 | 7/2017 | Zhang et al. |
| 2017/0029134 A1 | 2/2017 | Lee et al. |

(Continued)

FOREIGN PATENT DOCUMENTS

| CN | 105035303 A | 11/2015 |
| CN | 106285470 A | 1/2017 |
| CN | 205910594 U | 1/2017 |

OTHER PUBLICATIONS

International Search Report and Written Opinion (International Application No. PCT/IB2019/050831; O/R: 114063.00049); dated May 25, 2019; 9 pages.

*Primary Examiner* — Alex C Dunn
(74) *Attorney, Agent, or Firm* — Howard & Howard Attorneys PLLC

(57) ABSTRACT

An unmanned aerial vehicle is described herein. The unmanned aerial vehicle includes a fuselage body, a lift mechanism coupled to the fuselage body, and a depth sensing and obstacle avoidance system coupled to the fuselage body. The depth sensing and obstacle avoidance system includes a platform assembly, a pair of stereovision cameras coupled to a platform assembly, and a motor assembly coupled to the fuselage body and to the platform assembly. The platform assembly includes a support member extending between a first end and an opposite second end along a longitudinal axis. The pair of stereovision cameras includes each stereovision camera positioned at an opposite end of the support member. The motor assembly is configured to rotate the platform assembly with respect to the fuselage body about a rotational axis perpendicular to the longitudinal axis of the platform assembly.

20 Claims, 20 Drawing Sheets

(51) Int. Cl.
*B64C 39/02* (2006.01)
*H04N 5/225* (2006.01)
*H04N 13/204* (2018.01)
*G06K 9/00* (2006.01)
*G06T 7/50* (2017.01)
*H04N 5/247* (2006.01)

(52) U.S. Cl.
CPC ............ *G06K 9/00624* (2013.01); *G06T 7/50* (2017.01); *H04N 5/2253* (2013.01); *H04N 5/247* (2013.01); *H04N 13/204* (2018.05); *B64C 2201/141* (2013.01); *G06T 2207/10028* (2013.01); *G06T 2207/30252* (2013.01)

(56) References Cited

U.S. PATENT DOCUMENTS

| | | | | |
|---|---|---|---|---|
| 2017/0277187 | A1* | 9/2017 | Refai | G06T 7/30 |
| 2018/0176441 | A1* | 6/2018 | Burgess | B64D 47/08 |
| 2018/0184063 | A1* | 6/2018 | Burgess | G01C 11/02 |
| 2018/0184073 | A1* | 6/2018 | Burgess | B64C 39/024 |
| 2018/0295335 | A1* | 10/2018 | Burgess | G01S 19/31 |
| 2018/0313940 | A1* | 11/2018 | Wu | G05D 1/0246 |
| 2019/0226852 | A1* | 7/2019 | Xie | G01C 21/165 |
| 2020/0304775 | A1* | 9/2020 | Zhou | G06K 9/00201 |

* cited by examiner

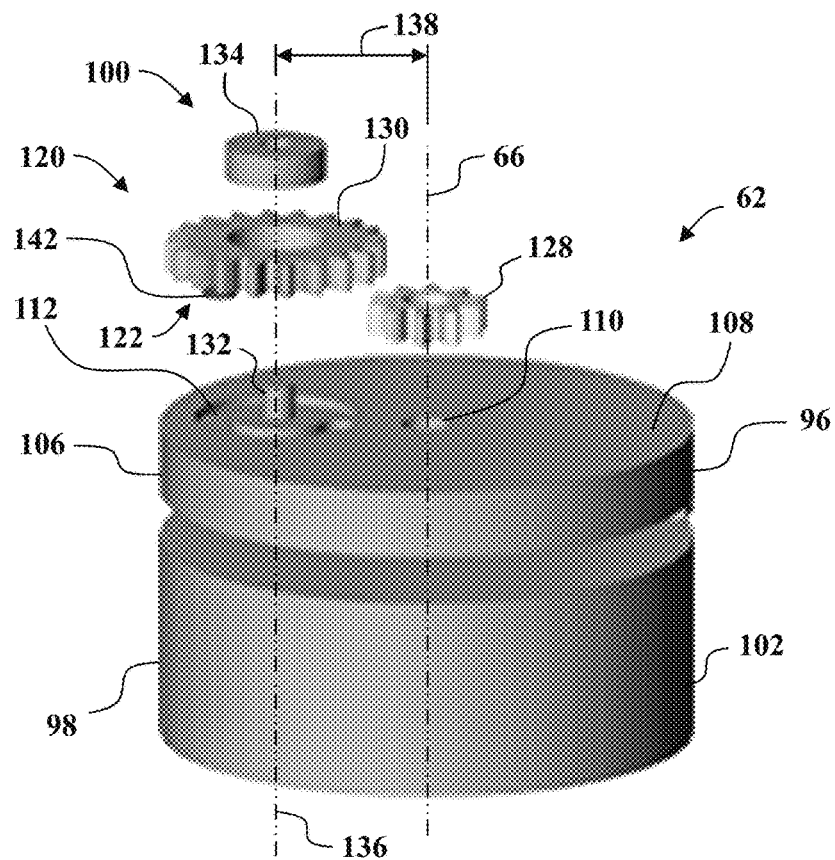
FIG. 11
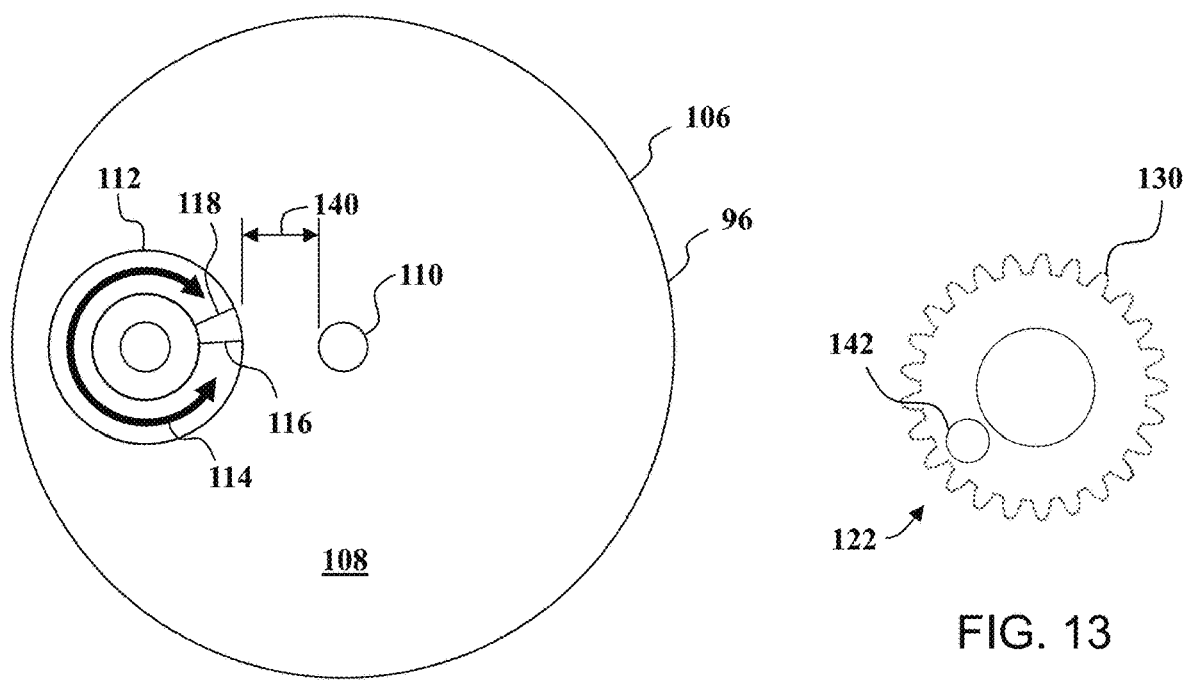
FIG. 12
FIG. 13

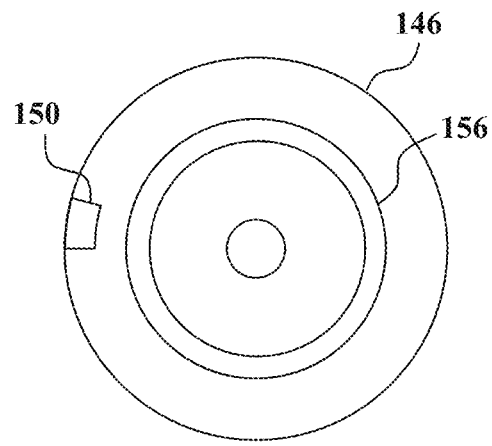
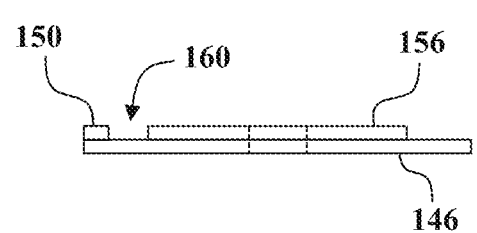
FIG. 16A
FIG. 16B
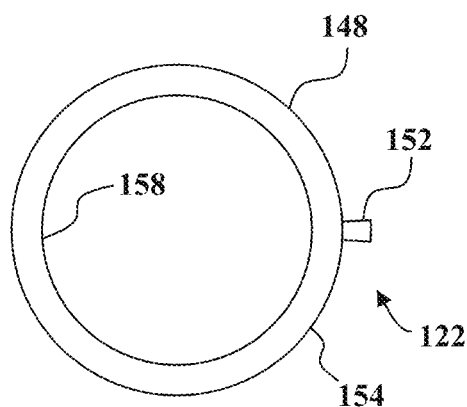
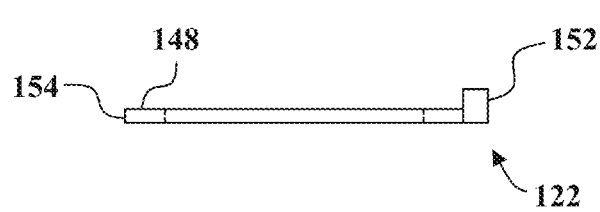
FIG. 17A
FIG. 17B
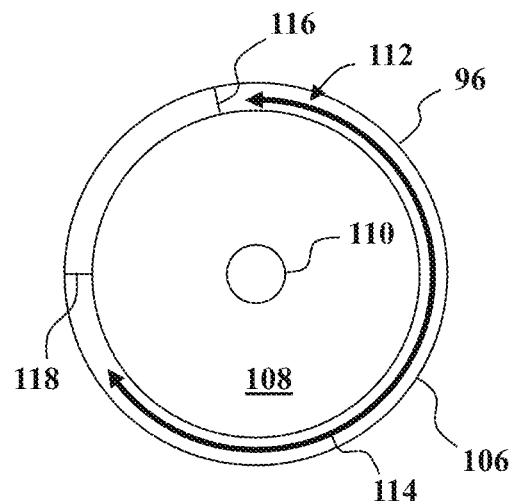
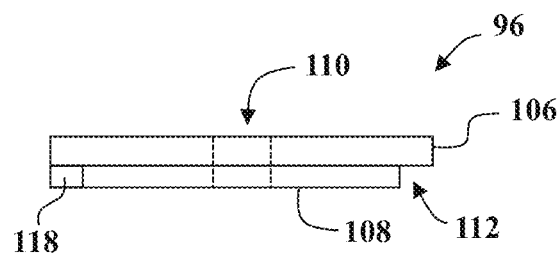
FIG. 18A
FIG. 18B

UNMANNED AERIAL VEHICLE INCLUDING AN OMNIDIRECTIONAL DEPTH SENSING AND OBSTACLE AVOIDANCE AERIAL SYSTEM AND METHOD OF OPERATING SAME

CROSS-REFERENCE TO RELATED APPLICATIONS

This application claims the benefit of U.S. Provisional Patent Application Ser. No. 62/627,276, filed on Feb. 7, 2018, which is hereby incorporated by reference in its entirety for all purposes.

TECHNICAL FIELD

This invention relates generally to the unmanned aerial vehicles, and more specifically, to systems and methods for operating omnidirectional depth sensing and obstacle avoidance in unmanned aerial vehicle systems. The systems typically includes an obstacle avoidance module that includes a one-axis motor and at least one stereovision pair of cameras.

BACKGROUND OF THE INVENTION

Depth sensing and obstacle avoidance is a key step toward building a fully autonomous aerial robot. Currently existing drones have demonstrated using sonar, proximity sensor, laser scanning range finder, time-of-flight based sensor, structural light based sensor or a stereovision camera pair to perform depth sensing toward one particular direction (forward/downward), or using multiple depth sensors (such as stereovision camera pairs) facing different directions to attempt obstacle avoidance in more directions. However, the fundamental flaw of this approach is that a rotary-wing drone (such as quadcopter, etc.), unlike a car or a ship, is capable of driving in all directions. A stereovision pair can only cover a limited range of driving angles. Using brute force to stacking multiple stereovision pairs is very inefficient, and can still fail in obstacle avoidance due to lack of full coverage (360 degrees) of horizontal field angle for depth sensing. Another existing attempt was to use a wide-angle lens or catadioptric lens to capture omnidirectional video information and then using techniques like structure from motion (SFM) or visual inertial odometry (VIO) to achieve single camera depth sensing. This approach relies on extremely accurate SFM/VIO in order to obtain usable absolute depth information and is very vulnerable to vibration and angular movement of the system, which occurs almost constantly on a drone. Recently, an omnistereo system based on the folded, catadioptric configuration with hyperboloidal mirrors is demonstrated, using only one camera sensor to achieve single frame omnidirectional depth sensing. It is indeed a cost-effective solution, however, the size of the rig of the system cannot be miniaturized if a decent depth sensing resolution is desired, and the system has to be mounted on top of the drone fuselage, making it less compact and elegant. Accordingly, there remains an opportunity for improvement.

SUMMARY OF THE INVENTION

In one embodiment of the present invention, an aerial system is provided. The aerial system includes a body, a lift mechanism coupled to the body, and a depth sensing and obstacle avoidance system coupled to the body and including a pair of cameras and a one-axis motor which rotates the pair of cameras.

In another embodiment of the present invention, a method of obtaining depth information of an environment using a depth sensing and obstacle avoidance system is provided.

In yet another embodiment of the present invention, an aerial system is provided. The aerial system includes a body and a lift mechanism coupled to the body. The system also includes a depth sensing and obstacle avoidance system coupled to the body. The depth sensing and obstacle avoidance system includes a pair of cameras and a one-axis motor which rotates said pair of cameras.

In one embodiment of the present invention, an unmanned aerial vehicle is provided. The unmanned aerial vehicle includes a fuselage body, a lift mechanism coupled to the fuselage body, and a depth sensing and obstacle avoidance system coupled to the fuselage body. The depth sensing and obstacle avoidance system includes a platform assembly, a pair of stereovision cameras coupled to a platform assembly, and a motor assembly coupled to the fuselage body and to the platform assembly. The platform assembly includes a support member extending between a first end and an opposite second end along a longitudinal axis. The pair of stereovision cameras includes each stereovision camera positioned at an opposite end of the support member. The motor assembly is configured to rotate the platform assembly with respect to the fuselage body about a rotational axis perpendicular to the longitudinal axis of the platform assembly.

In another embodiment of the present invention, a depth sensing and obstacle avoidance system for use with an unmanned aerial vehicle is provided. The aerial vehicle includes a fuselage body and a lift mechanism coupled to the fuselage body. The depth sensing and obstacle avoidance system includes a platform assembly, a pair of stereovision cameras coupled to a platform assembly, and a motor assembly coupled to the fuselage body and to the platform assembly. The platform assembly includes a support member extending between a first end and an opposite second end along a longitudinal axis. The pair of stereovision cameras includes each stereovision camera positioned at an opposite end of the support member. The motor assembly is configured to rotate the platform assembly with respect to the fuselage body about a rotational axis perpendicular to the longitudinal axis of the platform assembly.

In yet another embodiment of the present invention, a method of operating an aerial vehicle is provided. The aerial vehicle includes a fuselage body, a lift mechanism coupled to the fuselage body, and a depth sensing and obstacle avoidance system. The depth sensing and obstacle avoidance system includes a platform assembly, a pair of stereovision cameras coupled to a platform assembly, a motor assembly coupled to the fuselage body and to the platform assembly, and a processor. The platform assembly includes a support member extending between a first end and an opposite second end along a longitudinal axis. The pair of stereovision cameras includes each stereovision camera positioned at an opposite end of the support member. The motor assembly is configured to rotate the platform assembly with respect to the fuselage body about a rotational axis perpendicular to the longitudinal axis of the platform assembly. The method includes the processor performing the steps of receiving spherical video images from each of the stereovision cameras, identifying a corresponding image object in each of the received spherical video images, and rectifying each spherical video image onto a 2-dimensional (2D)

rectangular image having an X-axis defined between 0 to $\pi$ and a Y-axis defined between $-\pi/2$ and $\pi/2$. The processor identifies a view point within each rectified 2D rectangular image associated with the corresponding image object, determines a polar angle value of each view point along a corresponding X-axis of each rectified 2D rectangular image, determines an distance of the corresponding image object from the aerial vehicle based on the determined polar angle values, and operates the lift mechanism during a flight operation based on the determined distance of the corresponding image object from the aerial vehicle. The processor determines a current bearing direction of the aerial vehicle during the flight operation and operates the motor assembly to rotate the platform assembly to maintain an orientation of the longitudinal axis of the platform assembly perpendicular to the current bearing direction.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings.

FIG. 11 is an exploded view of the motor assembly shown in FIG. 10.

FIG. 12 is a top elevation view of a stator assembly used with the motor assembly shown in FIG. 10.

FIG. 13 is a bottom elevation view of a gear used with the motor assembly shown in FIG. 10.

FIG. 16A is a top elevation view of a ring component used with the motor assembly shown in FIG. 14.

FIG. 16B is a side elevation view of the ring component shown in FIG. 16A.

FIG. 17A is a top elevation view of another ring component used with the motor assembly shown in FIG. 14.

FIG. 17B is a side elevation view of the ring component shown in FIG. 17A.

FIG. 18A is a top elevation view of a stator assembly used with the motor assembly shown in FIG. 14.

FIG. 18B is a side elevation view of the ring component shown in FIG. 18A.

DETAILED DESCRIPTION OF THE DISCLOSURE

Figure 1:
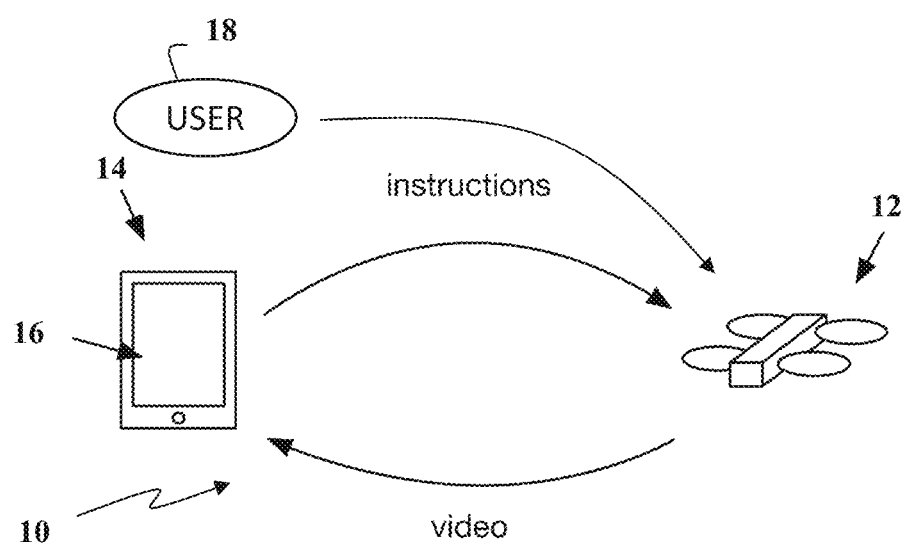
FIG. 1 is a schematic representation of an aerial system including an unmanned aerial vehicle and a system for controlling the aerial vehicle, according to one embodiment of the present invention.
Figure 2:
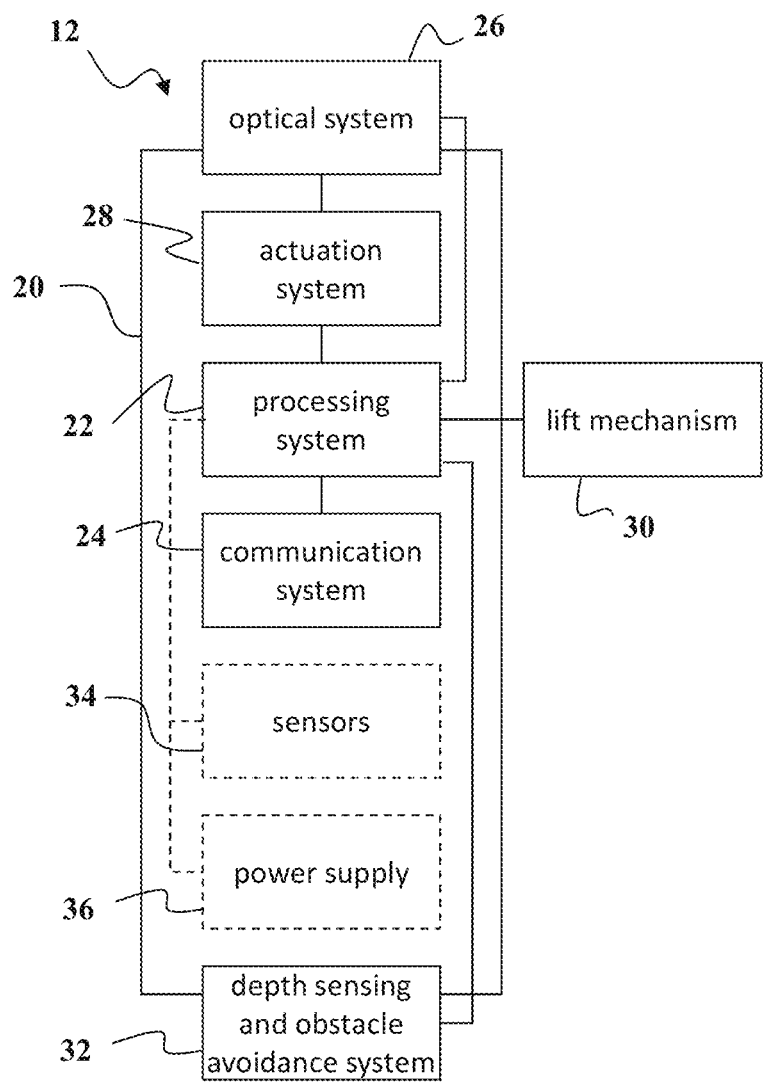
FIGS. 2 and 3 are schematic representations of the aerial vehicle shown in FIG. 1, according to an embodiment of the present invention.
Figure 3:
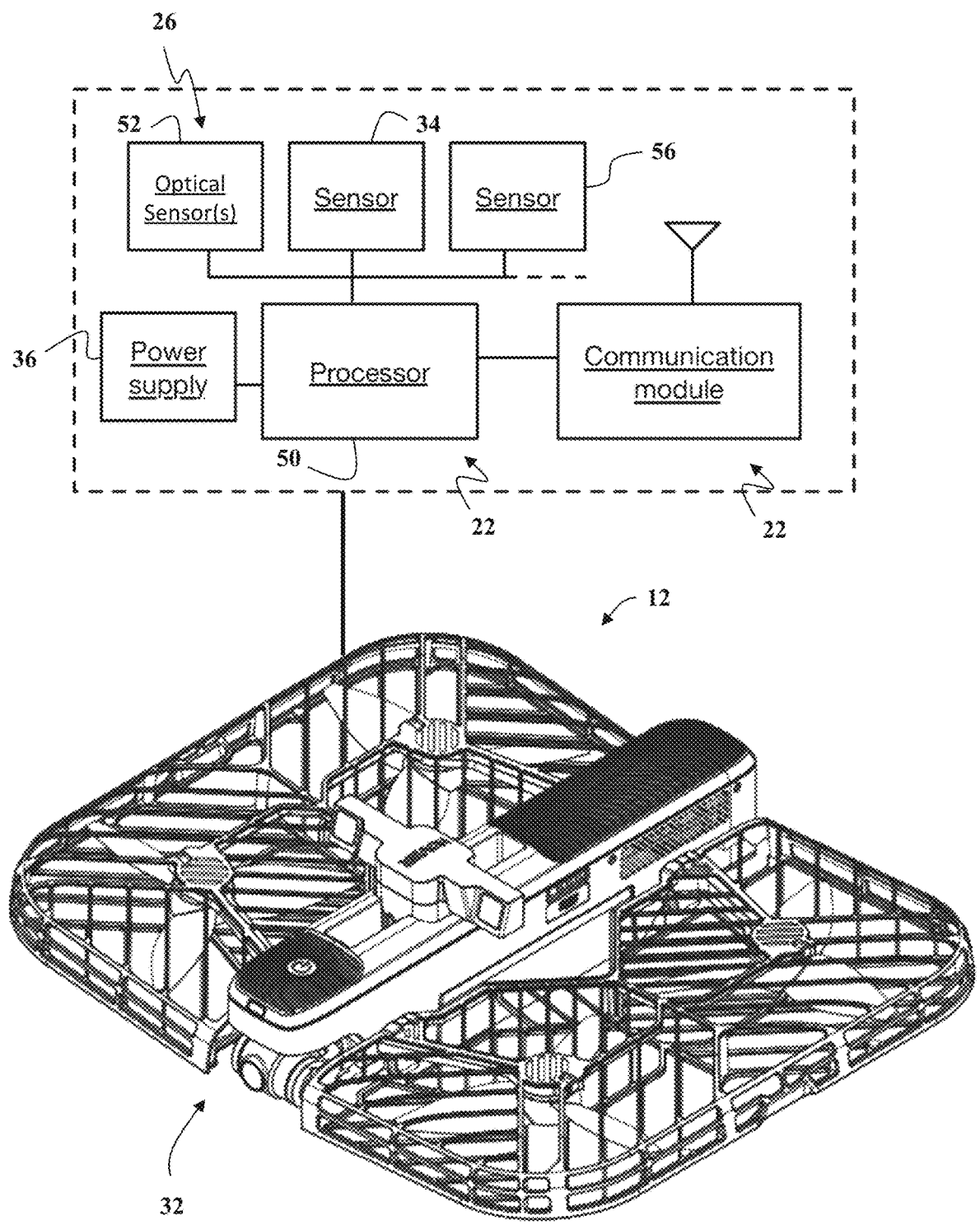

The following description of various embodiments of the disclosure is not intended to limit the disclosure to these embodiments, but rather to enable any person skilled in the art to make and use this disclosure. With reference to the drawings and in operation, a system 10 for controlling an unmanned aerial vehicle 12, for example a drone, is provided. As shown in FIG. 1, the system 10 may include a remote device 14 with a control client 16. The control client 16 provides a user interface (see below) that allows a user 18 to send instructions to the aerial vehicle 12 to control operation thereof. As described in detail below, the aerial vehicle 12 includes one or more cameras for obtaining pictures and/or video which may be sent to the remote device 14 and/or stored in memory on the aerial vehicle 12.

The aerial vehicle 12 may include one or more sensors for detecting or sensing operations or actions, i.e., expressions, performed by the user 18 to control operation of the aerial vehicle 12 without direct or physical interaction with the remote device 14. In controller-free embodiments, the entire control loop from start (release and hover) to finish (grab and go), as well as controlling motion of the aerial vehicle 12 and trigger of events, e.g., taking pictures and video, are performed solely on board the aerial vehicle 12 without involvement of the remote device 14. In some such embodiments or systems 10, a remote device 14 may not be provided or included.

In some embodiments, the remote device 14 includes one or more sensors that detect or sense operation or actions performed by the user 18 to control operation of the aerial vehicle 12 without physical interaction with the remote device 14 under certain conditions, for example, when the aerial vehicle 12 is too far from the user 18.

The System 10 and the Aerial Vehicle 12

An exemplary aerial vehicle 12 and control system is shown in the Figures. The control client 16 of the aerial vehicle 12 functions to receive data from the aerial vehicle 12, including video images and/or video, and control visual display on the remote device 14. The control client 16 may also receive operation instructions and facilitate aerial vehicle 12 remote control based on operation instructions. The control client 16 is typically configured to execute on a remote device 14, but can alternatively be configured to execute on the aerial vehicle 12 or on any other suitable system. As described above, and more fully below, the aerial vehicle 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial vehicle 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial vehicle 12 functions to fly within a physical space, capture video, stream the video in near-real time to the remote device 14, and operate based on operation instructions received from the remote device 14.

The aerial vehicle 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial vehicle 12 can additionally function to move an optical sensor's field of view within the physical space. For example, the aerial vehicle 12 can control macro movements (e.g., large FOV changes, on the order of meter adjustments), micro movements (e.g., small FOV changes, on the order of millimeter or centimeter adjustments), or any other suitable movement.

The aerial vehicle 12 can perform certain functionality based on onboard processing of sensor data from onboard sensors. This functionality may include, but is not limited to:
Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As shown in FIGS. 1-5. in the illustrated embodiment, the aerial vehicle 12 (e.g., drone) includes a fuselage body 20, a processing system 22, a communication system 24, an optical system 26, and an actuation mechanism 28 mounting the optical system 26 to the fuselage body 20, a lift mechanism 30, and an omnidirectional depth sensing and obstacle avoidance system 32. The aerial vehicle 12 can additionally or alternatively include, sensors 34, a power supply 36, or any other suitable component (see below).

The body 20 of the aerial vehicle 12 functions to mechanically protect and/or retain the aerial vehicle components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material. The body 20 can define a longitudinal axis 38, a lateral axis 40, a transverse axis 42, a front end, a back end (e.g., opposing the front end along the longitudinal axis), a top surface 44, a bottom surface 46 (e.g., opposing the top along the transverse axis), a center 48, or any other suitable reference. In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured.

The processing system 22 of the aerial vehicle 12 functions to control aerial vehicle operations. The processing system 22 can: receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more: processors 50 (e.g., CPU, GPU, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is typically connected to the active components of the aerial vehicle 12 and mounted to the body 20, but can alternatively be otherwise related to aerial system components.

The communication system 24 of the aerial system functions to send and/or receive information from the remote device 14. The communication system 24 is typically connected to the processing system 22, such that the communication system 24 sends and/or receives data form the processing system 22, but can alternatively be connected to any other suitable component. The aerial vehicle 12 can include one or more communication systems of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 typically shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

In one embodiment, the communication system 24 functions to communicate with one or more remote computing systems. The communication system 24 can be a long-range communication module, a short-range communication module, or any other suitable communication module. The communication system 24 can facilitate wired and/or wireless communication. Examples of the communication system 24 include an 802.11x, Wi-Fi, Wi-Max, NFC, RFID, Bluetooth, Bluetooth Low Energy, ZigBee, cellular telecommunications (e.g., 2G, 3G, 4G, LTE, etc.), radio (RF), wired connection (e.g., USB), or any other suitable communication system 24 or combination thereof. The communication system 24 is typically powered by the power supply 36, but can be otherwise powered. The communication system 24 is typically connected to the processing system 22, but can additionally or alternatively be connected to and interact with any other suitable component.

The optical system 26 of the aerial vehicle 12 functions to record images of the physical space proximal the aerial vehicle 12. The optical system 26 is typically mounted to the body 20 via the actuation mechanism 28, but can alternatively be statically mounted to the body 20, removably mounted to the body 20, or otherwise mounted to the body 20. The optical system 26 is typically mounted to the front end of the body 20, but can optionally be mounted to the bottom (e.g., proximal the front), top, back end, or any other suitable portion of the body 20. The optical system 26 is typically connected to the processing system 22, but can alternatively be connected to the communication system 24 or to any other suitable system. The optical system 26 can additionally include dedicated image processing hardware that automatically processes images recorded by the camera prior to transmission to the processor or other endpoint. The aerial vehicle 12 can include one or more optical systems of same or different type, mounted to the same or different position. In one variation, the aerial vehicle 12 includes a first optical system, mounted to the front end of the body 20, and a second optical system, mounted to the bottom of the body 20. The first optical system can actuate about a pivotal support, and the second optical system can be substantially statically retained relative to the body 20, with the respective active surface substantially parallel the body bottom. The first optical system can be high-definition, while the second optical system can be low definition. However, the optical system can be otherwise configured. The optical system 26 may be part of the obstacle avoidance system 32 described below or may be wholly independent therefrom.

The optical system 26 can include one or more optical sensors 52. The one or more optical sensors 52 can include: a single lens camera (e.g., CCD camera, CMOS camera, etc.), a stereo-camera, a hyperspectral camera, a multispectral camera, or any other suitable image sensor. However, the optical system 26 can be any other suitable optical system. The optical system 26 can define one or more active surfaces that receive light, but can alternatively include any other suitable component. For example, an active surface of a camera can be an active surface of a camera sensor (e.g., CCD sensor, CMOS sensor, etc.), typically including a regular array of sensor pixels. The camera sensor or other active surface is typically substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 52 can produce an image frame. The image frame typically corresponds with the shape of the active surface (e.g., rectangular, having a first and second frame edge opposing each other, etc.), more typically defining a regular array of pixel locations, each pixel location corresponding to a sensor pixel of the active surface and/or pixels of the images sampled by the optical sensor 52, but can alternatively have any suitable shape. The image frame typically defines aspects of the images sampled by the optical sensor 52 (e.g., image dimensions, resolution, pixel size and/or shape, etc.). The optical sensor 52 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial vehicle 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body, translate the optical system 26 along one or more axes relative to the body, or otherwise actuate the optical system 26. The optical sensor(s) 52 can be mounted to the support along a first end, along an optical sensor back (e.g., opposing the active surface), through the optical sensor body, or along any other suitable portion of the optical sensor 52.

In one variation, the actuation mechanism 28 can include a motor (not shown) connected to a single pivoted support (e.g., gimbal), wherein the motor pivots the support about the rotational (or gimbal) axis based on instructions received from the controller. The support is typically arranged with the rotational axis substantially parallel the lateral axis of the body 20, but can alternatively be arranged with the rotational axis at any other suitable orientation relative to the body 20. The support is typically arranged within a recessed cavity defined by the body 20, wherein the cavity further encompasses the optical sensor 52 but can alternatively be arranged along the body exterior or arranged at any other suitable portion of the body 20. The optical sensor 52 is typically mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is typically an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is typically mounted to the body 20 (e.g., the body interior), electrically connected to and controlled by the processing system 22, and electrically connected to and powered by a power source or power supply 36. However, the motor can be otherwise connected. The actuation mechanism 28 typically includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 52 offset from the optical sensor center of gravity, wherein the actuation mechanism 28 passively stabilizes the optical sensor 52.

The lift mechanism 30 of the aerial vehicle 12 functions to enable aerial system flight. The lift mechanism 30 typically includes a set propeller blades driven by a motor, but can alternatively include any other suitable propulsion mechanism. The lift mechanism 30 is typically mounted to the body 20 and controlled by the processing system 22, but can alternatively be otherwise mounted to the aerial vehicle 12 and/or controlled. The aerial vehicle 12 can include multiple lift mechanisms 30. In the illustrated embodiment, the aerial vehicle 12 includes four lift mechanisms 30 (e.g., two pairs of lift mechanisms 30), wherein the lift mechanisms 30 are substantially evenly distributed about the perimeter of the fuselage body 20 (e.g., wherein the lift mechanisms 30 of each pair oppose each other across the body 20). However, the lift mechanisms 30 can be otherwise configured.

The lift mechanism 30 of the aerial system functions to provide lift, and typically includes a set of rotor blades 54 driven (individually or collectively) by one or more motors. Each rotor 54 is typically configured to rotate about a corresponding rotor axis, define a corresponding rotor plane normal to its rotor axis, and sweep out a swept area on its rotor plane. The motors are typically configured to provide sufficient power to the rotor blades 54 to enable aerial system flight, and are more typically operable in two or more modes, at least one of which includes providing sufficient power for flight and at least one of which includes providing less power than required for flight (e.g., providing zero power, providing 10% of a minimum flight power, etc.). The power provided by the motors typically affects the angular velocities at which the rotor blades 54 rotate about their rotor axes. During aerial system flight, the set of rotor blades 54 are typically configured to cooperatively or individually generate (e.g., by rotating about their rotor axes) substantially all (e.g., more than 99%, more than 95%, more than 90%, more than 75%) of the total aerodynamic force generated by the aerial vehicle 12 (possibly excluding a drag force generated by the body 20 such as during flight at high airspeeds). Alternatively, or additionally, the aerial vehicle 12 can include any other suitable flight components that function to generate forces for aerial system flight, such as jet engines, rocket engines, wings, solar sails, and/or any other suitable force-generating components.

In one variation, the aerial vehicle 12 includes four rotor blades 54, each arranged at a corner of the aerial system body. The four rotor blades 54 are typically substantially evenly dispersed about the aerial system body, and each rotor plane is typically substantially parallel (e.g., within 10 degrees) a lateral plane of the aerial system body (e.g., encompassing the longitudinal and lateral axes). The rotor blades 54 typically occupy a relatively large portion of the entire aerial vehicle 12 (e.g., 90%, 80%, 75%, or majority of the aerial system footprint, or any other suitable proportion of the aerial vehicle 12). For example, the sum of the square of the diameter of each rotor 54 can be greater than a threshold amount (e.g., 10%, 50%, 75%, 90%, 110%, etc.) of the convex hull of the projection of the aerial vehicle 12 onto a primary plane of the system (e.g., the lateral plane). However, the rotor blades 54 can be otherwise arranged.

Additional sensors 56 of the aerial vehicle function to record signals indicative of aerial system operation, the ambient environment surrounding the aerial vehicle 12 (e.g., the physical space proximal the aerial vehicle 12), or any other suitable parameter. The sensors 56 are typically mounted to the body 20 and controlled by the processing system 22, but can alternatively be mounted to any other suitable component and/or otherwise controlled. The aerial vehicle 12 can include one or more sensors 34, 56. Examples of sensors that can be used include: orientation sensors (e.g., accelerometer, gyroscope, etc.), ambient light sensors, temperature sensors, pressure sensors, optical sensors, acoustic sensors (e.g., microphones), voltage sensors, current sensors, or any other suitable sensor.

The sensors 34, 56 of the aerial system function to acquire signals indicative of the aerial system's ambient environment and/or aerial system operation. The sensors 34, 56 are typically mounted to the body 20, but can alternatively be mounted to any other suitable component. The sensors 34, 56 are typically powered by the power supply 36 and controlled by the processor, but can be connected to and interact with any other suitable component. The sensors 34, 56 can include one or more: cameras (e.g., CCD, CMOS, multispectral, visual range, hyperspectral, stereoscopic, etc.), orientation sensors (e.g., inertial measurement sensors, accelerometer, gyroscope, altimeter, magnetometer, etc.), audio sensors (e.g., transducer, microphone, etc.), barometers, light sensors, temperature sensors, current sensor (e.g., Hall effect sensor), air flow meter, voltmeters, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor. In one variation, the aerial vehicle 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number of any sensor type.

The power supply 36 of the aerial vehicle 12 functions to power the active components of the aerial vehicle 12. The power supply 36 is typically mounted to the body 20, and electrically connected to all active components of the aerial vehicle 12 (e.g., directly or indirectly), but can be otherwise arranged. The power supply 36 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

The aerial vehicle 12 can optionally be used with a remote computing system, or with any other suitable system. The aerial vehicle 12 functions to fly, and can additionally function to take photographs, deliver loads, and/or relay wireless communications. The aerial vehicle 12 is typically a rotorcraft (e.g., quadcopter, helicopter, cyclocopter, etc.), but can alternatively be a fixed-wing aircraft, aerostat, or be any other suitable aerial vehicle.

The processing system 22 of the aerial system functions to control aerial system operation. The processing system 22 can perform the method; stabilize the aerial vehicle 12 during flight (e.g., selectively operate the rotor blades 54 to minimize aerial system wobble in-flight); receive, interpret, and operate the aerial vehicle 12 based on remote control instructions; or otherwise control aerial system operation. The processing system 22 is typically configured to receive and interpret measurements sampled by the sensors 34, 56, more typically by combining measurements sampled by disparate sensors (e.g., combining camera and accelerometer data). The aerial vehicle 12 can include one or more processing systems, wherein different processors can perform the same functionality (e.g., function as a multi-core system), or be specialized. The processing system 22 can include one or more: processors (e.g., CPU, GPU, microprocessor, etc.), memory (e.g., Flash, RAM, etc.), or any other suitable component. The processing system 22 is typically mounted to the body 20, but can alternatively be mounted to any other suitable component. The processing system 22 is typically powered by the power supply 36, but can be otherwise powered. The processing system 22 is typically connected to and controls the sensors 34, 56, communication system 24, and lift mechanism 30, but can additionally or alternatively be connected to and interact with any other suitable component.

The body 20 of the aerial system functions to support the aerial system components. The body can additionally function to protect the aerial system components. The body 20 typically substantially encapsulates the communication system 24, power supply 36, and processing system 22, but can be otherwise configured. The body 20 can include a platform, a housing, or have any other suitable configuration. In one variation, the body 20 includes a main body housing the communication system 24, power supply 36, and processing system 22, and a first and second frame (e.g., cage) extending parallel the rotor rotational plane and arranged along a first and second side of the main body 20. The frames can function as an intermediary component between the rotating rotor blades 54 and a retention mechanism (e.g., retention mechanism such as a user's hand). The frame can extend along a single side of the body 20 (e.g., along the bottom of the rotor blades 54, along the top of the rotor blades 54), along a first and second side of the body 20 (e.g., along the top and bottom of the rotor blades 54), encapsulate the rotor blades 54 (e.g., extend along all sides of the rotor blades 54), or be otherwise configured. The frames can be statically mounted or actuatably mounted to the main body 20.

The frame can include one or more apertures (e.g., airflow apertures) fluidly connecting one or more of the rotor blades 54 to an ambient environment, which can function to enable the flow of air and/or other suitable fluids between the ambient environment and the rotor blades 54 (e.g., enabling the rotor blades 54 to generate an aerodynamic force that causes the aerial system to move throughout the ambient environment). The apertures can be elongated, or can have comparable length and width. The apertures can be substantially identical, or can differ from each other. The apertures are typically small enough to prevent components of a retention mechanism (e.g., fingers of a hand) from passing through the apertures. The geometrical transparency (e.g., ratio of open area to total area) of the frame near the rotor blades 54 is typically large enough to enable aerial system flight, more typically enabling high-performance flight maneuvering. For example, each aperture can be smaller than a threshold size (e.g., smaller than the threshold size in all dimensions, elongated slots narrower than but significantly longer than the threshold size, etc.). In a specific example, the frame has a geometrical transparency of 80-90%, and the apertures (e.g., circles, polygons such as regular hexagons, etc.) each of define a circumscribed circle with a diameter of 12-16 mm. However, the body can be otherwise configured.

The body 20 (and/or any other suitable aerial system components) can define a retention region that can be retained by a retention mechanism (e.g., a human hand, an aerial system dock, a claw, etc.). The retention region typically surrounds a portion of one or more of the rotor blades 54, more typically completely surrounding all of the rotor blades 54, thereby preventing any unintentional interaction between the rotor blades 54 and a retention mechanism or other object near the aerial vehicle 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotor blades 54 (e.g., swept area of a rotor, total swept area of the set of rotors, etc.) onto the same aerial system plane.

The aerial vehicle 12 can additionally include inputs (e.g., microphones, cameras, etc.), outputs (e.g., displays, speakers, light emitting elements, etc.), or any other suitable component.

The remote computing system functions to receive auxiliary user inputs, and can additionally function to automatically generate control instructions for and send the control instructions to the aerial vehicle(s) 12. Each aerial vehicle 12 can be controlled by one or more remote computing systems. The remote computing system typically controls the aerial vehicle 12 through a client (e.g., a native application, browser application, etc.), but can otherwise control the aerial vehicle 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

The aerial vehicle 12 may be configured for controller-free user drone interaction. Normally, the aerial system, or drone, requires a separate device, e.g., the remote device 14. The remote device 14 may be embodied in different types of devices, including, but not limited to a ground station, remote control, or mobile phone, etc. In some embodiments, control of the aerial vehicle 12 may be accomplished by the user through user expression without utilization of the remote device 14. User expression may include, but is not limited to, any action performed by the user that do not include physical interaction with the remote device 14, including thought (through brain wave measurement), facial expression (including eye movement), gesture and/or voice. In such embodiments, user instructions are received directly via the optical sensors 52 and at least some of the other sensors 34, 56 and processed by the onboard processing system 22 to control the aerial vehicle 12. In some embodiments, the aerial vehicle 12 may alternatively be controlled via the remote device 14.

In at least one embodiment, the aerial vehicle 12 may be controlled without physical interaction with the remote device 14, however, a display of the remote device 14 may be used to display images and/or video relayed from the aerial vehicle 12 which may aid the user 18 in controlling the aerial vehicle 12. In addition, sensors 34, 56 associated with the remote device 14, e.g., camera(s) and/or a microphone (not show) may relay data to the aerial vehicle 12, e.g., when the aerial vehicle 12 is too far away from the user 18. The sensor data relayed from the remote device 14 to the aerial vehicle 12 is used in the same manner as the sensor data from the on-board sensors 34, 56 are used to control the aerial vehicle 12 using user expression.

In this manner, the aerial vehicle 12 may be fully controlled, from start to finish, either (1) without utilization of a remote device 14, or (2) without physical interaction with the remote device 14. Control of the aerial vehicle 12 is based on user instructions received at various on-board sensors 34, 56. It should be noted that in the following discussion, utilization of on-board sensors 34, 56 may also include utilization of corresponding or similar sensors on the remote device 14.

In general, the user 18 may utilize certain gestures and/or voice control to control take-off, landing, motion of the aerial vehicle 12 during flight and other features, such as triggering of photo and/or video capturing. As described above, the aerial vehicle 12 may provide the following features without utilization of, or processing by, a remote device 14:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As detailed above, the aerial vehicle 12 includes an optical system 26 that includes one or more optical sensors 52, such as a camera. The at least one on-board camera is configured for live video streaming and computer vision analysis. Optionally the aerial vehicle 12 can have at least one depth sensor (or stereo-vision pair) for multi-pixel depth sensing. Optionally the aerial vehicle 12 can have at least one microphone on board for voice recognition and control.

In general, in order to provide full control of the aerial vehicle 12, a plurality of user/drone interactions or activities from start to end of an aerial session are provided. The user/drone interactions, include, but are not limited to take-off and landing, owner recognition gesture recognition, facial expression recognition, and voice control.

Omnidirectional Depth Sensing and Obstacle Avoidance System 32 and Method:

Referring to FIGS. 4-30, in the illustrated embodiment, the aerial vehicle 12 also includes an omnidirectional depth sensing and obstacle avoidance system 32. The omnidirectional depth sensing and obstacle avoidance system 32 may include any one or more of the aforementioned components (e.g. sensors, cameras, etc.). Alternatively, this omnidirectional depth sensing and obstacle avoidance system 32 may include entirely different components from what are described above. This omnidirectional depth sensing and obstacle avoidance system 32 and the method described below is a low cost solution for achieving true 360 degree depth sensing and obstacle avoidance.

In the illustrated embodiment, the omnidirectional depth sensing and obstacle avoidance system 32 includes a platform assembly 58, a stereovision camera assembly 60 coupled to the platform assembly 58, a motor assembly 62, and a control unit 64 operatively coupled to the stereovision camera assembly 60 and the motor assembly 62 for controlling the operations of the omnidirectional depth sensing and obstacle avoidance system 32. The motor assembly 62 is coupled to the fuselage body 20 and to the platform assembly 58 and is configured to rotate the platform assembly 58 and stereovision camera assembly 60 with respect to the fuselage body 20 about a rotational axis 66.

Figure 6A:
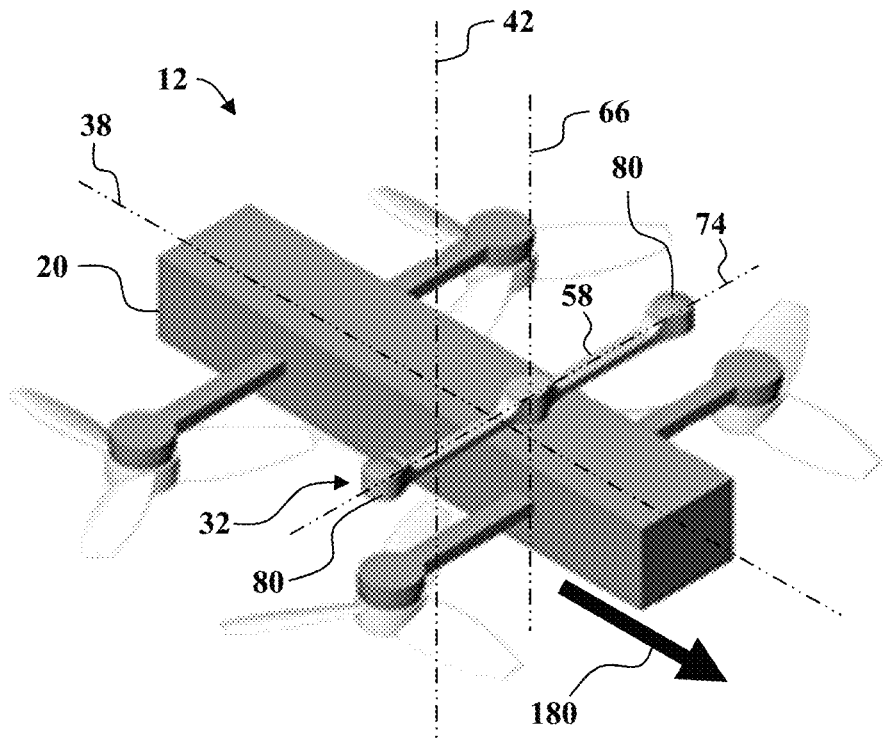
FIGS. 6A and 6B are perspective views of the aerial vehicle shown in FIG. 4 during a flight operation, according to an embodiment of the present invention.
Figure 6B:
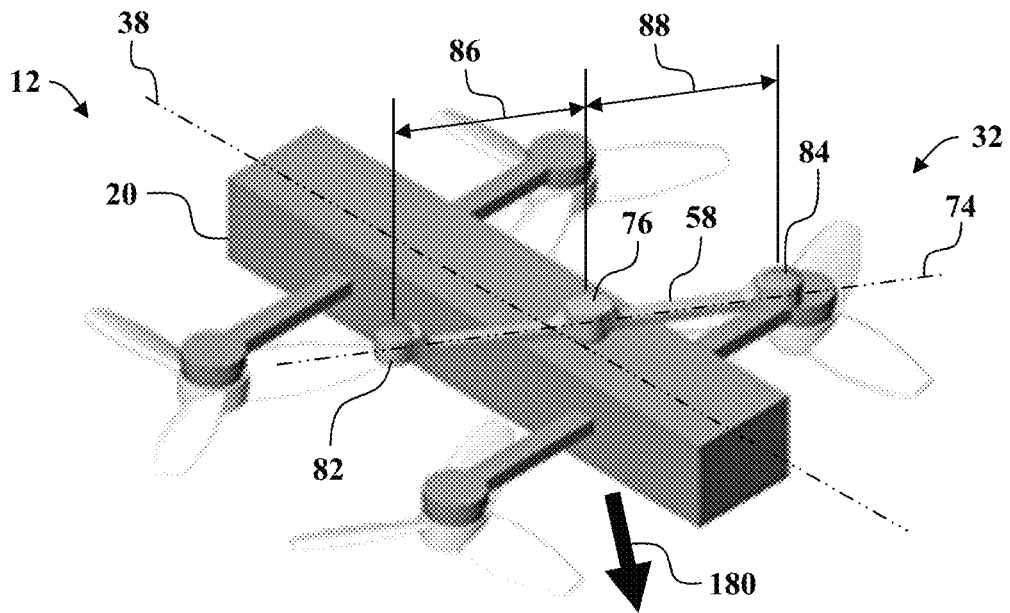

The platform assembly 58 includes a support member 68 that extends between a first end 70 and an opposite second end 72 along a longitudinal axis 74. The support member 68 includes a center mounting arm 76 that is coupled to the motor assembly 62 and a pair of supporting arms 78 that extend radially outward from the center mounting arm 76 in opposite directions along the longitudinal axis 74. In the illustrated embodiment, the stereovision camera assembly 60 includes a pair of stereovision cameras 80 that are coupled to the supporting arms 78 of the platform assembly 58. The pair of stereovision cameras 80 includes a first stereovision camera 82 that is positioned at the first end 70 of the platform assembly and a second stereovision camera 84 that is positioned at the second end 72 of the platform assembly 58 such that each stereovision camera 82, 84 is positioned at an opposite end of the support member 68. In the illustrated embodiment, the platform assembly 58 is coupled to the motor assembly 62 such that the rotational axis 66 is perpendicular to the longitudinal axis 74 of the platform assembly. As shown in FIG. 6B, the first stereovision camera 82 is spaced a first distance 86 from the rotational axis 66 along the longitudinal axis 74, and the second stereovision camera 84 is spaced a second distance 88 from the rotational axis 66 along the longitudinal axis 74. In one embodiment, the first distance 86 is equal to the second distance 88 such that the first and second stereovision cameras 82, 84 are positioned equidistant from the rotational axis 66. In other embodiments, the first distance 86 is greater than, or less than, the second distance 88. In one embodiment, the pair of cameras 80 may be mounted or statically fixed to a housing of the body 20.

Figure 19:
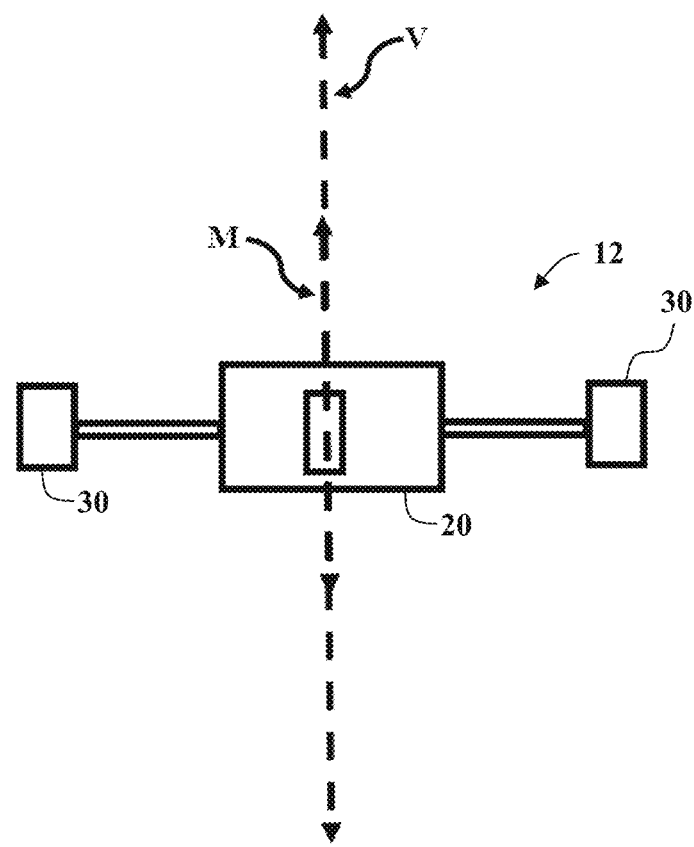
FIG. 19 is a schematic view of the aerial vehicle shown in FIG. 4, according to an embodiment of the present invention.

The omnidirectional depth sensing and obstacle avoidance system 32 can be mounted to a top of the drone body 20, e.g. either permanently or detachably. The omnidirectional depth sensing and obstacle avoidance system 32 may be alternatively described as a module and typically includes a one-axis motor and at least one stereovision pair of cameras. The control unit 64, the motor assembly 62, and/or the cameras 80 can be powered in a wired (FPC cable) or wireless (wireless charging) manner. Data transmission between the cameras 80, the control unit 64, and the electronics in the main body 20 of the aerial vehicle 12 can also be achieved via FPC cable or wireless transmission module such as WiFi/Bluetooth. The wired version can be a low cost solution, but with limited rotation range (typically less than 180 degrees). In various embodiments, the motor assembly 62 is orientated along a motor axis (M) that is aligned to the vertical axis (V) of the drone body 20, e.g. as shown in FIG. 19.

In one of the embodiments, each camera 80 includes a lens module, which may be any type known in the art or described above, e.g. a fisheye type facing upward. The fisheye lens module of each camera 80 has a field of view equal to or greater than 180 deg. The lens module is typically an equidistant type so that the peripheral pixels are not compromised and a spherical stereo model can be used for disparity calculation and depth sensing.

The method described in greater detail below and/or omnidirectional depth sensing and obstacle avoidance system 32 can confer several benefits over conventional systems. First, the images recorded by the camera 80 are processed on-board, in real- or near-real time. This allows the aerial vehicle 12 to navigate using the images recorded by the cameras 80.

In one embodiment, each stereovision camera 80 includes a lens or lens module including an ultra-wide angle lens. The selection of an ultra-wide angle lens design is typically to be stereographic or equidistant so that the marginal regions of the FOV (which is the most important in this scenario) are not compressed too much. Pixels within the overlapping stereo region of interest (SROI) from the two cameras can be first rectified into a pair of panoramic images from its original warped omnidirectional images. Typically, the two cameras 80 should have the same pixel size, pixel number, and lens design (intrinsic parameters). After rectification, pixel correspondence methods can be used to obtain depth information via triangulation. Techniques for image point matching are generally divided between dense (area-based scanning) and sparse (feature description) approaches. With a sparse feature points/dense point cloud with depth information, path and trajectory planning algorithms (such as rapidly-exploring random tree—RRT, A*, etc.) can be applied to generate the desired path of the drone to avoid obstacles.

The distance between two ultra-wide angle cameras directly relates to the depth sensing precision. The following relationship holds:

$$\Delta D = \frac{D^2}{B} \tan(\Delta \varphi) \qquad \text{Equation (1)}$$

where $\Delta D$ is the distance error, D is the measured distance, B is the baseline distance between two cameras, $\Delta \varphi$ is the angle of view per pixel. Typically, it is necessary to keep a distance of 5-6 cm between the effective foci of the two cameras (assuming the camera satisfies a single effective view point—SVP model) in order to make the depth sensing applicable for obstacle sensing and avoidance. In other embodiments, the major procedures for obtaining depth information is approximately the same as a traditional stereovision depth sensing algorithm, including stereovision calibration, rectification, disparity matching, depth calculation, etc.

In the illustrated embodiment, the pair of stereovision cameras 80 include ultra-wide angle lens cameras (shown in FIG. 4) having a viewing direction 90 orientated parallel to the rotational axis 66 and away from the fuselage body 20. In other embodiments, the viewing direction 90 of each ultra-wide angle lens camera 80 may be orientated in any suitable direction, and each viewing direction 90 of each ultra-wide angle lens camera 80 may be oriented differently.

Figure 7:
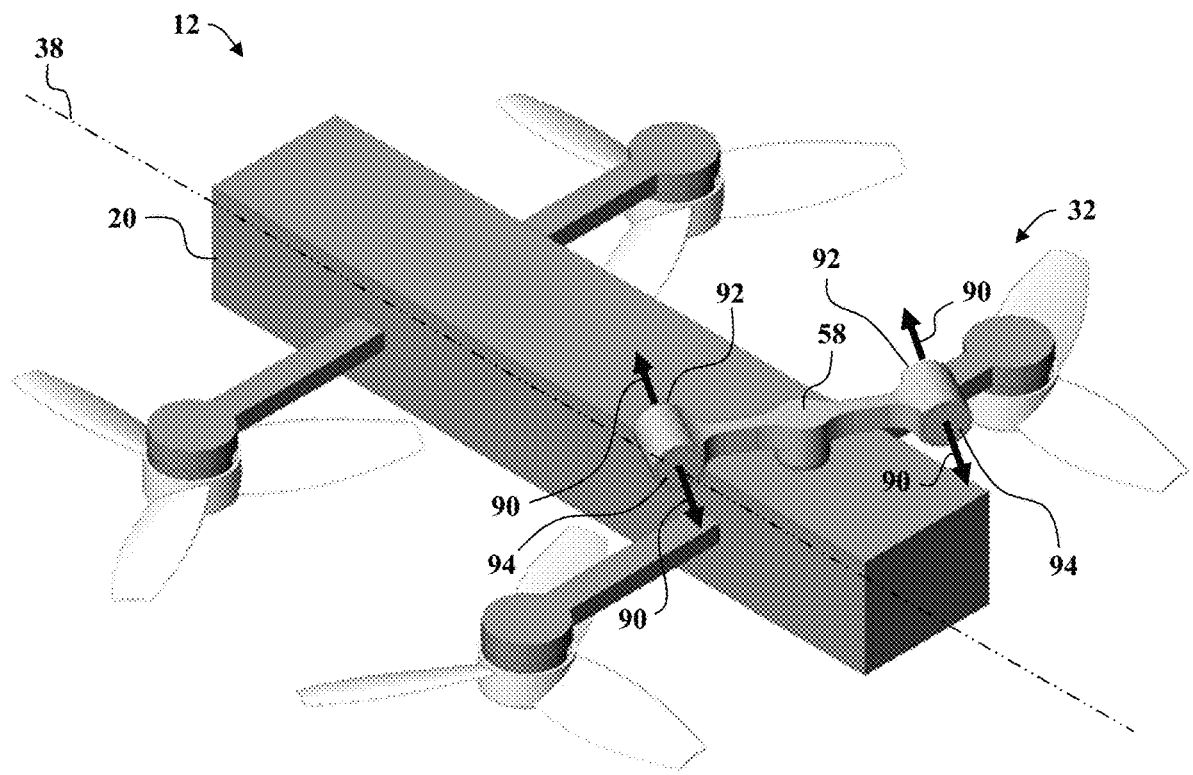
FIGS. 7 and 8 are perspective views of the aerial vehicle including the omnidirectional depth sensing and obstacle avoidance system shown in FIG. 4, according to an embodiment of the present invention.

In one embodiment, two pairs of ordinary stereovision cameras 80, e.g. disposed back to back. For example, as shown in FIG. 7, the stereovision camera assembly 60 may include a first pair of stereovision cameras 92 mounted on a first side of the platform assembly 58 and a second pair of stereovision cameras 94 mounted on an opposite second side of the platform assembly 58. The field of view of each camera 80 can be normal around 70 degrees (diagonal). In still another embodiment, one pair of ordinary stereovision cameras 80 having a viewing direction 90 parallel with the longitudinal axis 38 of the fuselage body 20, e.g. facing in a horizontal direction relative to the body 20, can be used. In this configuration, the motor assembly 62 for rotating the cameras 80 typically must be capable of rotating more than 360 degrees.

Figure 4:
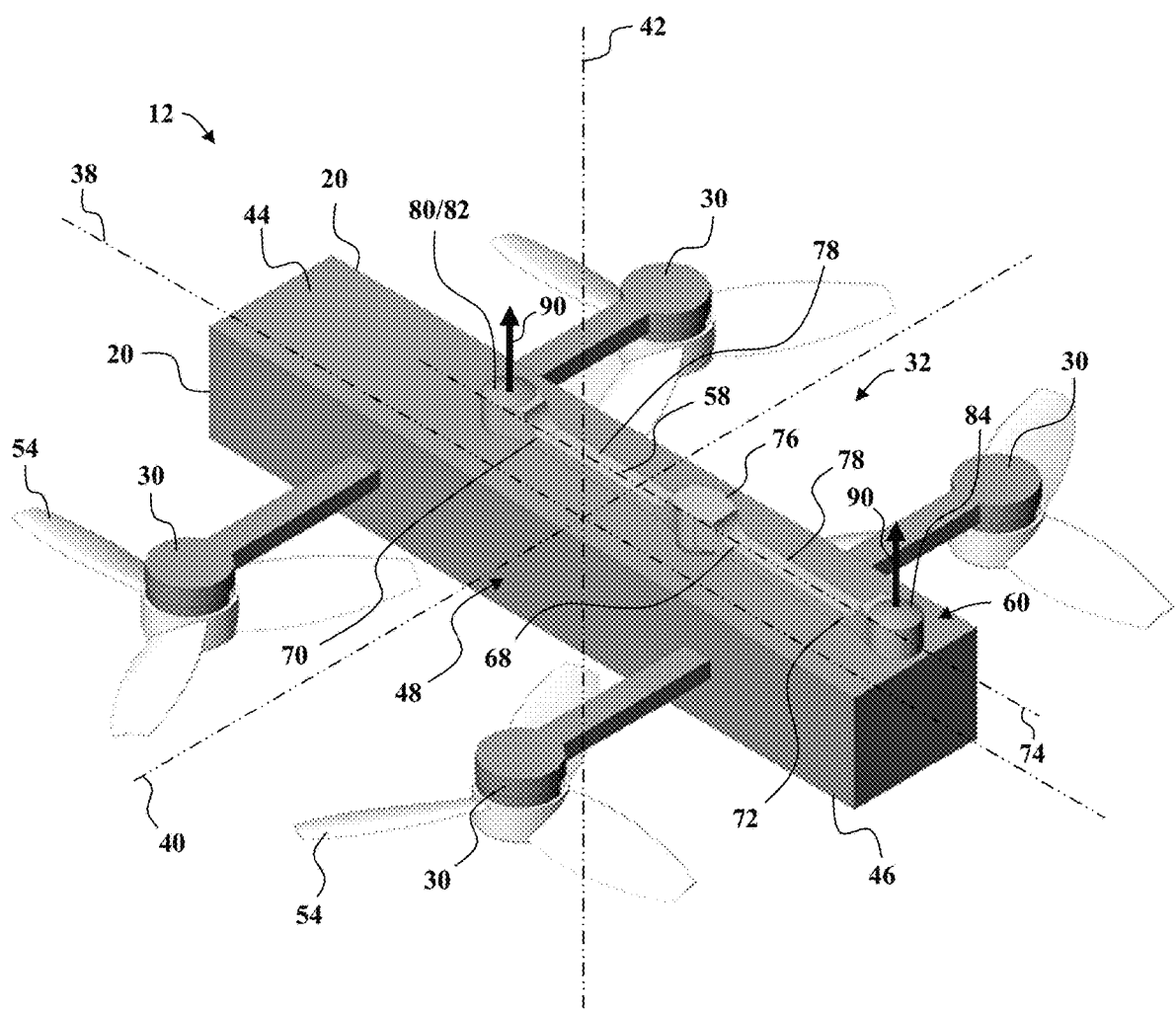
FIG. 4 is a perspective view of the aerial vehicle shown in FIG. 1, including an omnidirectional depth sensing and obstacle avoidance system, according to an embodiment of the present invention.

In one embodiment, the omnidirectional depth sensing and obstacle avoidance system 32 includes a stereovision depth sensing platform 58 which includes at least two cameras 80 (e.g. at least one stereovision pair), each disposed on an arm 78, e.g. as shown in FIG. 4. The platform 58 is typically rotatable by a motor which may be any known in the art or described herein. In one embodiment, the platform 58 is disposed on/connected to a rotor of a motor, such as a one-axis motor, e.g. as shown in FIG. 4. The motor can be any known in the art or can be as described below. In one embodiment, the motor is as shown in FIGS. 10-18B.

Referring to FIGS. 10-18B, in the illustrated embodiment, the motor assembly 62 includes a stator assembly 96, a rotor assembly 98 that is rotatably coupled to the stator assembly 96, and a rotation limiting assembly 100. The stator assembly 96 operates the cause the rotor assembly 98 to rotate about the rotational axis 66. The rotor assembly 98 includes a rotor 102 and a rotor shaft 104. The rotor 102 is coupled to the platform assembly 58 and the rotor shaft 104 is coupled to the rotor 102 and to the stator assembly 96 for rotating the rotor 102 and platform assembly 58 about the rotational axis 66.

In the illustrated embodiment, the stator assembly 96 includes a stator base 106 having an outer surface 108 and a shaft opening 110 extending through the outer surface 108. The shaft opening 110 is sized and shaped to receive the rotor shaft 104 therethrough to facilitate supporting the rotor assembly 98 from the stator assembly 96. The rotation limiting assembly 100 is coupled to the rotor assembly 98 and to the stator assembly 96 for limiting an angle of rotation of the rotor assembly 98 about the rotational axis 66. In the illustrated embodiment, the motor assembly 62 includes a brushless gimbal motor.

In one embodiment, as shown in FIGS. 12, 18A and 18B, the rotation limiting assembly 100 includes an arcuate slot 112 that is defined along the outer surface 108 of the stator assembly 96. The arcuate slot 112 includes a travel path 114 that extends between a first slot endwall 116 and a second slot endwall 118. The rotation limiting assembly 100 also includes a positioning assembly 120 that includes including a positioning member 122 that is sized and shaped to travel within the arcuate slot 112. During operation, the positioning member 122 is configured to travel within the arcuate slot 112 along the travel path 114 towards the first slot endwall 116 as the rotor assembly 98 is rotated in a first rotational direction 124 and contacts the first slot endwall 116 to prevent additional rotation of the rotor assembly 98 in the first rotational direction 124. The positioning member 122 also travels within the arcuate slot 112 along the travel path 114 towards the second slot endwall as the rotor assembly 98 is rotated in a second rotational direction 126 and contacts the second slot endwall 118 to prevent additional rotation of the rotor assembly 98 in the second rotational direction 126.

In one embodiment, as shown in FIGS. 10-13, the positioning assembly 120 includes a first gear 128, a second gear 130, a support shaft 132, and a bearing 134. The first gear 128 is coupled to the rotor shaft 104 such that a rotation of the rotor shaft 104 rotates the first gear 128 about the rotational axis 66. The support shaft 132 extending outwardly from the outer surface 108 of the stator assembly 96 along a shaft centerline axis 136, and is spaced a radial distance 138 from the rotor shaft 104 and rotational axis 66. The bearing 134 is rotatably coupled to the support shaft 132. The second gear 130 is coupled to the bearing 134 and is configured to rotate about the support shaft 132 with respect to the stator assembly 96. The second gear 130 is coupled in a meshed arrangement with the first gear 128 such that a rotation of the first gear 128 causes a rotation of the second gear 130 about the support shaft 132. The arcuate slot 112 is defined around a perimeter of the support shaft 132. The arcuate slot 112 is spaced a distance 140 from the shaft opening 110 such that the arcuate slot 112 does not encompass the rotor shaft 104. The positioning member 122 includes a pin 142 extending outwardly from an outer surface of the second gear 130 and positioned within the arcuate slot 112 to travel within the arcuate slot 112 to contact the first slot endwall 116 and the second slot endwall 118.

In the illustrated embodiment, the motor assembly 62 includes the rotor assembly 98, the rotor shaft 104, the stator assembly 96, the first gear 128, and the second gear 130 with the bearing 134 and the pin 142 attached to the second gear 130. The first gear 128 can be mounted on the rotor shaft 104, and can rotate along with the rotor 102. The first gear 128 and the second gear 130 can mate with the gear ratio $R_{gear}$ less than 1:1, such that the first gear 128 can rotate for a large angle (more than 360 degrees) while the second gear 130 only rotates a fraction of the angle. When assembled, the pin 142 attached to the second gear 130 can slide freely in the arcuate slot 112 on the stator base 106. The total angle that the slot covers $\Theta_{slot}$ defines the travel range limits $\Theta_{rotor}$ of the motor, with the relations as below:

$$\Theta_{rotor} = \frac{\Theta_{slot}}{R_{gear}} \qquad \text{Equation (2)}$$

Referring to FIGS. 14-18B, in another embodiment, the positioning assembly 120 includes a plurality of ring components 144 that are configured to operate to limit a rotation of the rotor assembly 98. For example, the positioning assembly 120 may include a first ring component 146 that is coupled to the rotor shaft 104 and a second ring component 148 that is positioned between the stator assembly 96 and the first ring component 146. The first ring component 146 is coupled to the rotor shaft 104 such that a rotation of the rotor shaft 104 rotates the first ring component 146 about the rotational axis 66. The first ring component 146 includes a positioning protrusion 150 that extends outwardly from an outer surface of the first ring component 146 and towards the stator assembly 96.

The second ring component 148 is coupled between the first ring component 146 and the stator assembly 96. The second ring component 148 includes the positioning member 122. The positioning member 122 includes a positioning flange 152 that extends outwardly from a radially outer surface 154 of the second ring component 148. The positioning flange 152 is orientated within the arcuate slot 112 to travel within the arcuate slot 112 along the travel path 114 to contact the first slot endwall 116 and the second slot endwall 118. In this embodiment, the arcuate slot 112 is defined around a perimeter of the outer surface 108 of the stator assembly 96 such that the arcuate slot 112 extends around a perimeter of the rotor shaft 104. The positioning protrusion 150 is sized, shaped, and positioned to contact the positioning flange 152 as the first ring component 146 is rotated by the rotor assembly 98 to move the positioning flange 152 along the travel path 114 of the arcuate slot 112.

In one embodiment, the first ring component 146 includes a support member 156 that extends outwardly from the outer surface of the first ring component 146 and towards the stator assembly 96. The second ring component 148 includes a radially inner surface 158 that contacts the support member 156 to support the second ring component 148 from the first ring component 146 such that the first ring component 146 is rotatable with respect to the second ring component 148. As shown in FIG. 16B, the positioning protrusion 150 is orientated with respect to the support member 156 such that a gap 160 is defined between the positioning protrusion 150 and the support member 156. The gap 160 is sized and shaped to receive the second ring component 148 such that radially outer surface 154 of the second ring component 148 is positioned between the positioning protrusion 150 and the support member 156 to enable the positioning protrusion 150 to contact the positioning flange 152 as the first ring component 146 rotates about the rotational axis 66.

Figure 10:
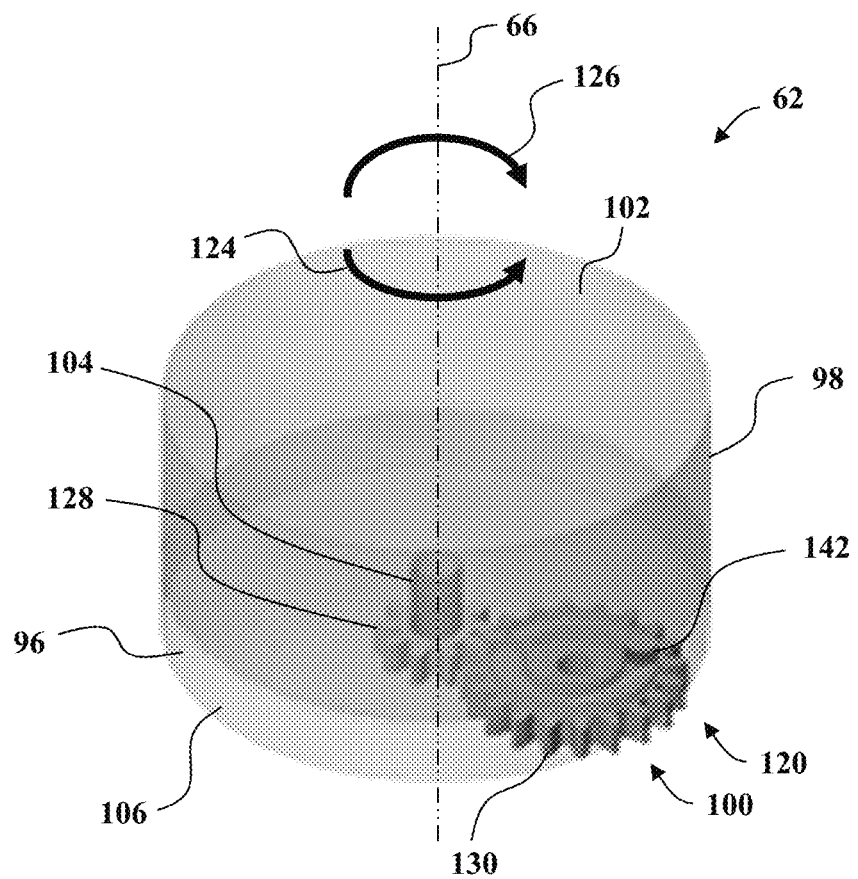
FIG. 10 is a perspective view of a motor assembly including a rotation limiting assembly that may be used with the omnidirectional depth sensing and obstacle avoidance system shown in FIG. 4, according to an embodiment of the present invention.
Figure 14:
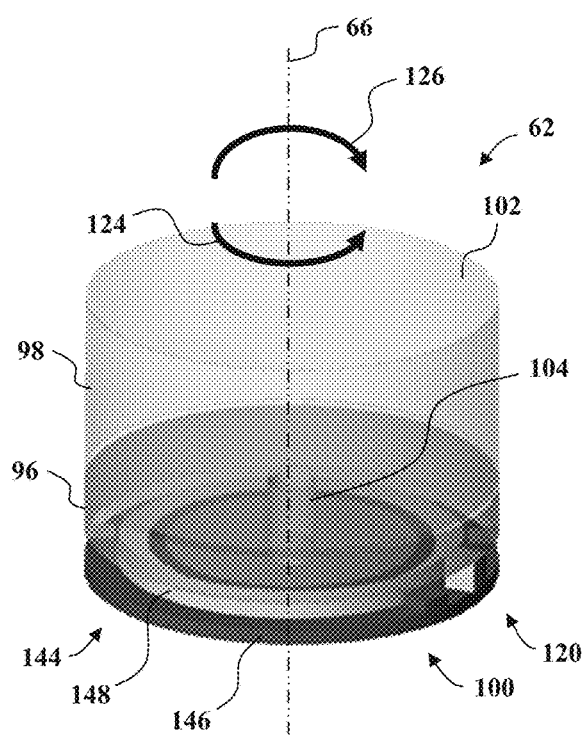
FIG. 14 is a perspective view of another motor assembly including a rotation limiting assembly that may be used with the omnidirectional depth sensing and obstacle avoidance system shown in FIG. 4, according to an embodiment of the present invention.
Figure 15:
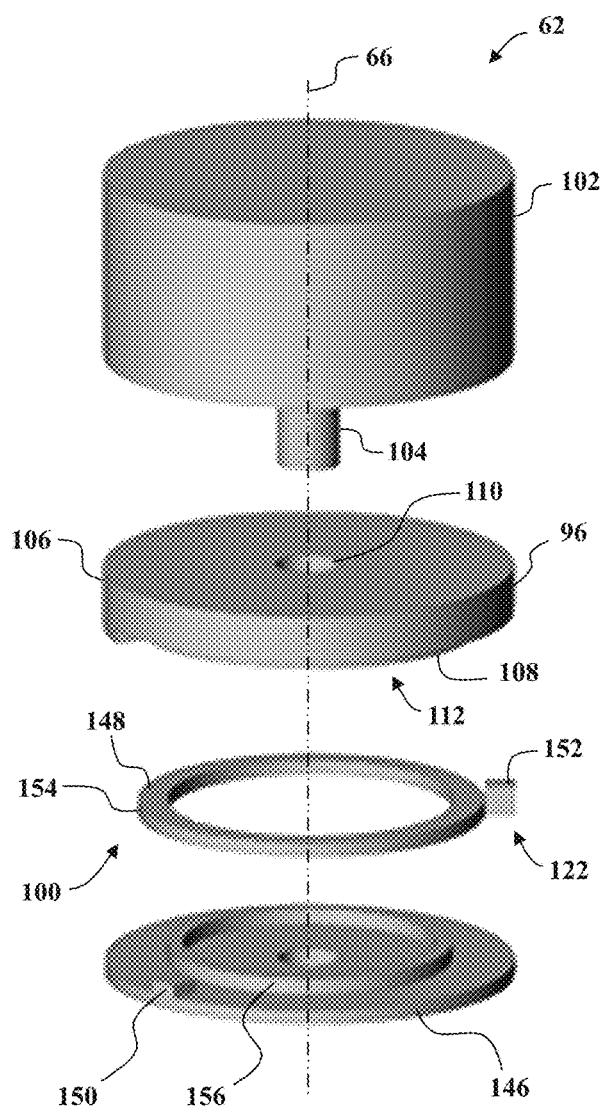
FIG. 15 is an exploded view of the motor assembly shown in FIG. 14.

In other embodiments, the positioning assembly 120 may include two or more ring components, e.g. the first ring component 146 and the second ring component 148, having features to achieve a full rotation limit angle greater than 360 degrees, e.g. as shown in FIG. 14. In still other embodiments, the motor assembly 62 is a brushless gimbal motor. The motor assembly 62 can include the rotor assembly 98, the rotor shaft 104, the stator assembly 96, the first ring component 146, and the second ring component 148. Each ring component typically has a limiting feature. After assembly, the first ring component 146 can be mounted to the rotor shaft 104 and can rotate along with the rotor assembly 98. The second ring component 148 is typically concentric with the first ring component 146, and can freely rotate against the first ring component 146. When the limiting features of these two ring components 146, 148 collide with each other, if the rotor assembly 98 keeps rotating in the same direction, the rotor assembly 98 typically will bring those two ring components 146, 148 together with the rotor assembly 98, until the limiting feature on the second ring component 148 reaches a hard end feature on the stator assembly 96. As shown in FIGS. 10 and 14, the total range of rotation of the rotor assembly 98 is about 540 degrees (one and a half revolutions). The design can be modified with additional ring components to allow even larger rotation range.

Figure 8:
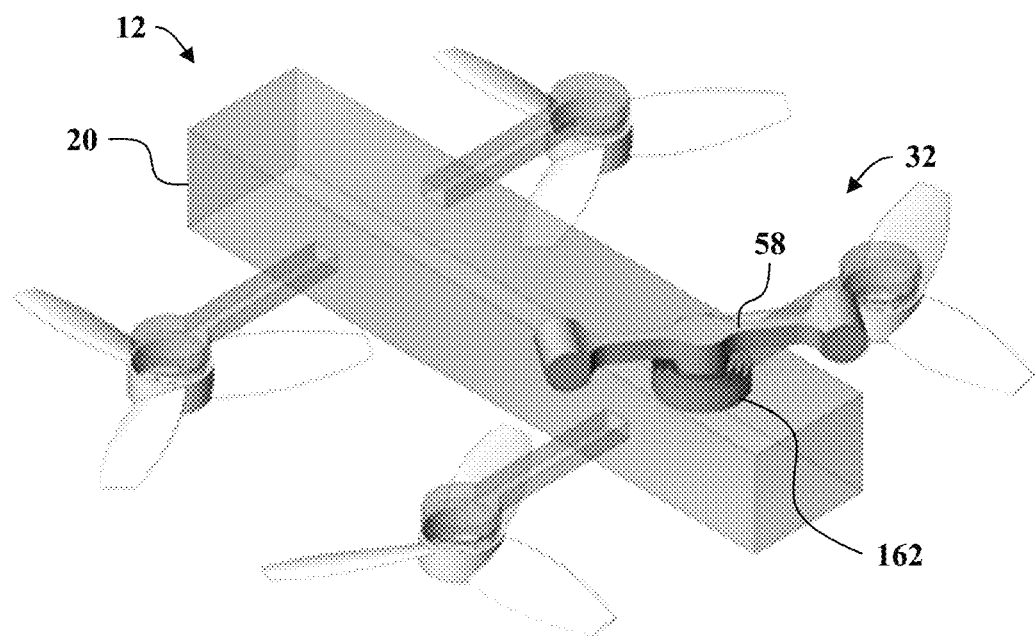
Figure 9:
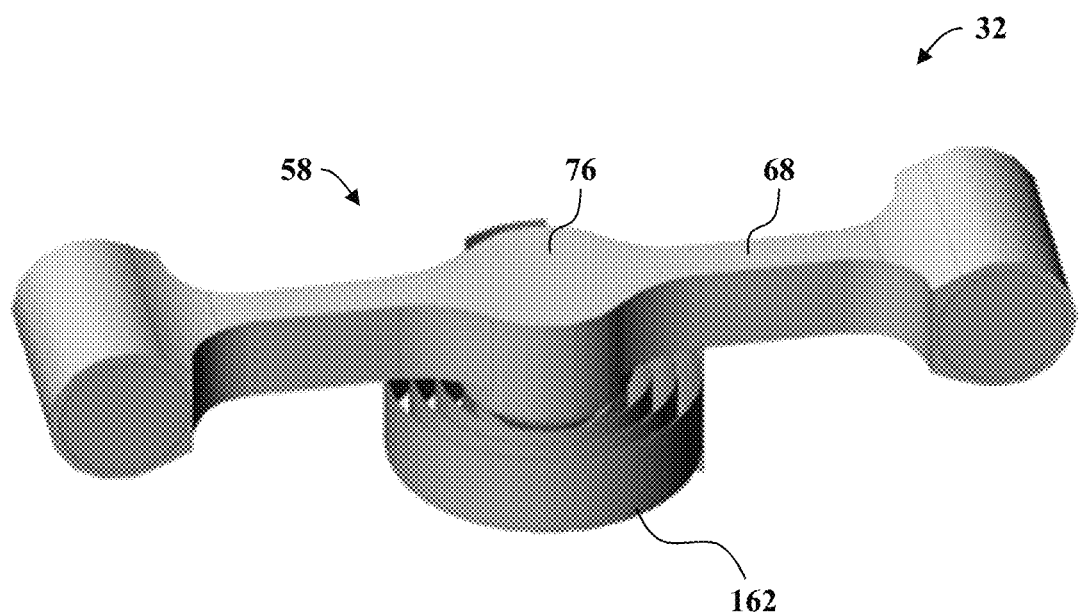
FIG. 9 is an enlarged view of a portion of the omnidirectional depth sensing and obstacle avoidance system shown in FIG. 8.

Referring to FIGS. 8-9, in one embodiment, the control unit 64 may be mounted on a printed circuit board that is positioned within the fuselage body 20. For example, the control unit 64 may include a processor for controlling the operation of the omnidirectional depth sensing and obstacle avoidance system 32 and/or the aerial vehicle 12 that is mounted on the printed circuit board. The omnidirectional depth sensing and obstacle avoidance system 32 may include a flexible printed circuit 162 that is coupled between the printed circuit board and the stereovision camera assembly 60 including the pair of stereovision cameras 80. The flexible printed circuit 162 may be arranged in a coiled arrangement about the center mounting arm 76 of the platform assembly 58. By having the flexible printed circuit 162 coiled about the center mounting arm 76, the platform assembly 58 may be rotated about the rotational axis 66 without having the flexible printed circuit 162 restrict rotation of the platform assembly 58. Moreover, the wiring from the rotating depth sensing platform to the main body of the drone can be achieved with a customized FPC cable 162 design, as shown in the FIG. 9. Alternatively, the wiring from the rotating depth sensing platform 58 to the main body 20 of the drone can be achieved with a coaxial cable with a connector at each end. In the illustrated embodiment, the coil spring shape FPC 162 allows rotation of the platform 58 without tangling the cable. The two ends of the cable can be fixed to the platform 58 and the main body 20 respectively.

Figure 5:
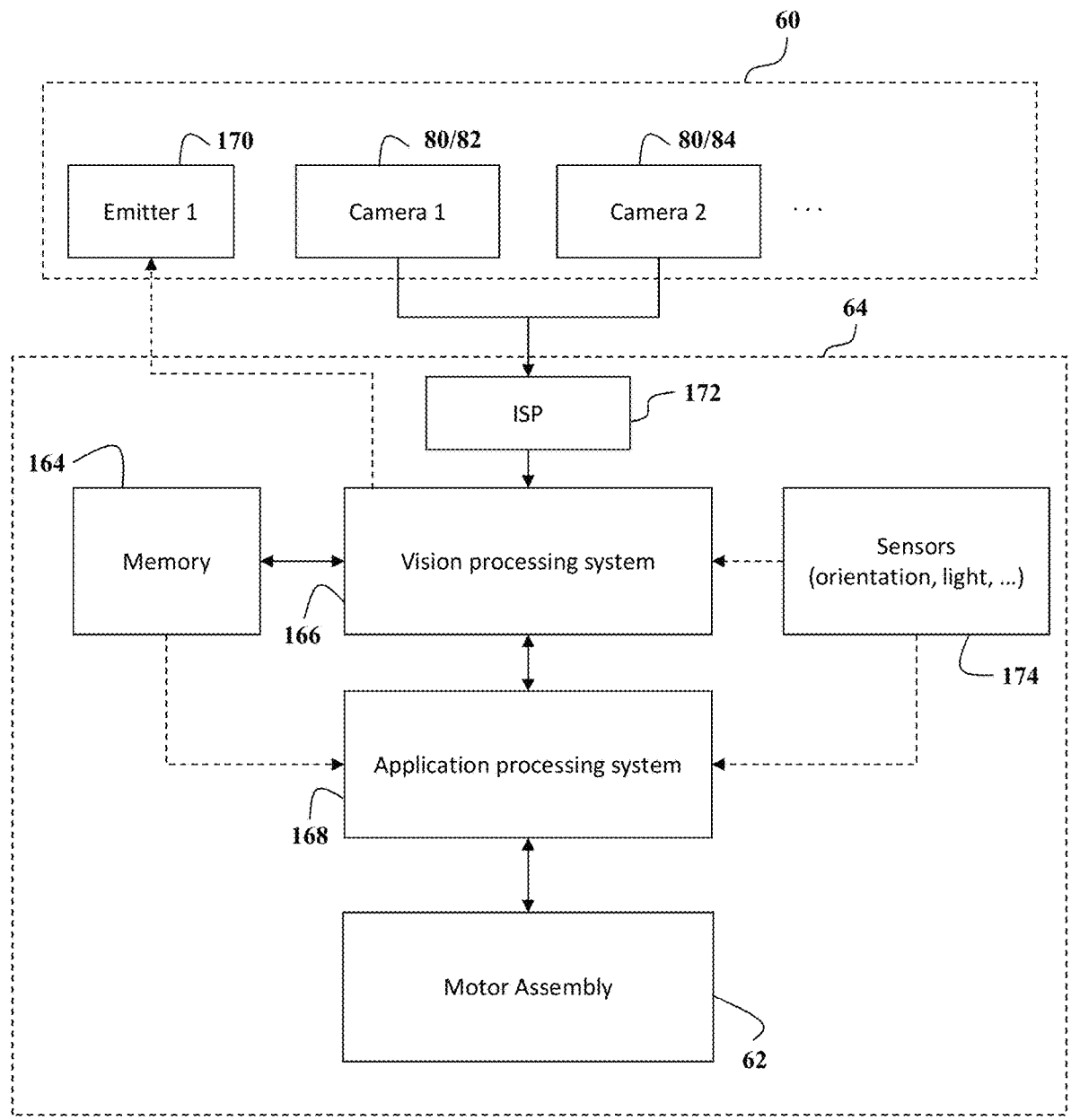
FIG. 5 is a schematic representation of the omnidirectional depth sensing and obstacle avoidance system shown in FIG. 4, according to an embodiment of the present invention.

Referring to FIG. 5, in the illustrated embodiment, the omnidirectional depth sensing and obstacle avoidance system 32 includes a control unit 64 for operating the omnidirectional depth sensing and obstacle avoidance system 32. In one embodiment, the control unit 64 may communicate with the processing system 22 of the aerial vehicle 12 to facilitate operating the aerial vehicle 12. In another embodiment, the processing system 22 of the aerial vehicle 12 includes the control unit 64 and/or is programmed to perform the function of control unit 64 in operating the omnidirectional depth sensing and obstacle avoidance system 32. The control unit 64 includes a memory 164, a vision processing system 166 and an application processing system 168. The memory 164 and the vision processing system 166 are connected to the pair of stereovision cameras 80. The omnidirectional depth sensing and obstacle avoidance system 32 can function to sample images of a monitored region for real- or near-real time image processing, such as depth analysis. The omnidirectional depth sensing and obstacle avoidance system 32 can additionally or alternatively generate 3D video, generate a map of the monitored region, or perform any other suitable functionality.

The platform assembly 58 typically functions to retain the pair of cameras 80 in a predetermined configuration. The omnidirectional depth sensing and obstacle avoidance system 32 typically includes a single platform assembly 58 that retains the pair of cameras 80, but can alternatively include multiple platform pieces or any other suitable number of platforms. The pair of cameras 80 may function to sample signals of the ambient environment surrounding the aerial vehicle 12. The pair of cameras 80 are arranged with the respective view cone of each camera overlapping a view cone of the other camera.

In one embodiment, each camera 80 of this disclosure can independently be a CCD camera, CMOS camera, or any other suitable type of camera. The camera 80 can be sensitive in the visible light spectrum, IR spectrum, or any other suitable spectrum. The camera 80 can be hyperspectral, multispectral, or capture any suitable subset of bands. The cameras 80 can have a fixed focal length, adjustable focal length, or any other suitable focal length. However, the camera can have any other suitable set of parameter values. The cameras 80 can be identical or different. Each camera 80 is typically associated with a known location relative to a reference point (e.g., on the platform, a camera 80, on the host robot, etc.), but can be associated with an estimated, calculated, or unknown location.

In one embodiment, the aerial vehicle 12 and/or the omnidirectional depth sensing and obstacle avoidance system 32, may also include an emitter 170 that functions to illuminate a physical region monitored by the cameras 80. For example, the stereovision camera assembly 60 may include one emitter 170 for one or more of the cameras 80, multiple emitters 170 for one or more of the cameras 80, or any suitable number of emitters 170 in any other suitable configuration. The emitter(s) 170 can emit modulated light, structured light (e.g., having a known pattern), collimated light, diffuse light, or light having any other suitable property. The emitted light can include wavelengths in the visible range, UV range, IR range, or in any other suitable range. The emitter position (e.g., relative to a given camera) is typically known, but can alternatively be estimated, calculated, or otherwise determined.

In one embodiment, the pair of cameras 80 are typically statically mounted to the platform assembly 58 (e.g., through-holes in the platform assembly), but can alternatively be actuatably mounted to the platform assembly 58 (e.g., by a joint). The cameras 80 can be mounted to the platform faces, edges, vertices, or to any other suitable platform feature. The cameras 80 can be aligned with, centered along, or otherwise arranged relative to the platform feature. The cameras 80 can be arranged with an active surface perpendicular a platform radius or surface tangent, an active surface parallel a platform face, or be otherwise arranged. Adjacent camera active surfaces can be parallel each other, at a non-zero angle to each other, lie on the same plane, be angled relative to a reference plane, or otherwise arranged. Adjacent cameras 80 typically have a baseline (e.g., inter-camera or axial distance, distance between the respective lenses, etc.) of 6.35 cm, but can be further apart or closer together.

The cameras 80 may be connected to the same visual processing system and memory, or can be connected to disparate visual processing systems and/or memories. The cameras 80 are typically sampled on the same clock, but can be connected to different clocks (e.g., wherein the clocks can be synchronized or otherwise related). The cameras 80 are typically controlled by the same processing system, but can be controlled by different processing systems. The cameras 80 are typically powered by the same power source (e.g., rechargeable battery, solar panel array, etc.; host robot power source, separate power source, etc.), but can be powered by different power sources or otherwise powered.

The memory 164 of the control unit 64 functions to store camera measurements, e.g. as schematically shown in FIG. 5. The memory 164 can additionally function to store settings; maps (e.g., calibration maps, pixel maps); camera positions or indices; emitter positions or indices; or any other suitable set of information. The control unit 64 can include one or more pieces of memory. The memory 164 is typically nonvolatile (e.g., flash, SSD, eMMC, etc.), but can alternatively be volatile (e.g. RAM). In one variation, the cameras 80 write to the same buffer, wherein each camera 80 is assigned a different portion of the buffer. In a second variation, the cameras 80 write to different buffers in the same or different memory. However, the cameras 80 can write to any other suitable memory. The memory 164 is typically accessible by all processing systems of the system (e.g., vision processor, application processor), but can alternatively be accessible by a subset of the processing systems (e.g., a single vision processor, etc.).

The vision processing system 166 of the control unit 64 can function to determine the distance of a physical point from the aerial vehicle 12. The vision processing system 166 includes one or more vision processing processors. The vision processing processor can be a CPU, GPU, microprocessor, or any other suitable processing system. The vision processing system 166 typically determines the pixel depth of each pixel from a subset of pixels, but can additionally or alternatively determine the object depth or determine any other suitable parameter of a physical point or collection thereof (e.g., object). The vision processing system 166 typically processes the sensor stream from the cameras 80.

The vision processing system 166 may process each sensor stream at a predetermined frequency (e.g., 30FPS), but can process the sensor streams at a variable frequency or at any other suitable frequency. The predetermined frequency can be received from an application processing system 168, retrieved from storage, automatically determined based on a camera score or classification (e.g., front, side, back, etc.), determined based on the available computing resources (e.g., cores available, battery level remaining, etc.), or otherwise determined. In one variation, the vision processing system 166 processes multiple sensor streams at the same frequency. In a second variation, the vision processing system 166 processes multiple sensor streams at different frequencies, wherein the frequencies are determined based on the classification assigned to each sensor stream (and/or source camera), wherein the classification is assigned based on the source camera orientation relative to the host robot's travel vector.

An application processing system 168 functions to determine the time multiplexing parameters for the sensor streams. The application processing system 168 can additionally or alternatively perform object detection, classification, tracking (e.g., optical flow), or any other suitable process using the sensor streams. The application processing system 168 can additionally or alternatively generate control instructions based on the sensor streams (e.g., based on the vision processor output). For example, navigation (e.g., using SLAM, RRT, etc.) or visual odometry processes can be performed using the sensor streams, wherein the system and/or host robot is controlled based on the navigation outputs.

The application processing system 168 can additionally or alternatively receive control commands and operate the aerial vehicle 12 and/or host robot based on the commands. The application processing system 168 can additionally or alternatively receive external sensor information and selectively operate the vehicle 12 and/or host robot based on the commands. The application processing system 168 can additionally or alternatively determine vehicle system kinematics (e.g., position, direction, velocity, and acceleration) based on sensor measurements (e.g., using sensor fusion). In one example, the application processing system 168 can use measurements from an accelerometer and gyroscope to determine the traversal vector of the vehicle 12 and/or host robot (e.g., system direction of travel). The application processing system 168 can optionally automatically generate control instructions based on the vehicle system kinematics. For example, the application processing system 168 can determine the location of the vehicle (in a physical volume) based on images from the cameras 80, wherein the relative position (from the orientation sensors) and actual position and speed (determined from the images) can be fed into the flight control module. In this example, images from a downward-facing camera subset can be used to determine system translation (e.g., using optical flow), wherein the system translation can be further fed into the flight control module. In a specific example, the flight control module can synthesize these signals to maintain the robot position (e.g., hover a drone).

The application processing system 168 can include one or more application processors. The application processor can be a CPU, GPU, microprocessor, or any other suitable processing system. The application processing system 168 can implemented as part of, or separate from, the vision processing system 166, or be different from the vision processing system 166. The application processing system 168 may be connected to the vision processing system 166 by one or more interface bridges. The interface bridge can be a high-throughput and/or bandwidth connection, and can use a MIPI protocol (e.g., 2-input to 1-output camera aggregator bridges—expands number of cameras that can be connected to a vision processor), a LVDS protocol, a DisplayPort protocol, an HDMI protocol, or any other suitable protocol. Alternatively, or additionally, the interface bridge can be a low-throughout and/or bandwidth connection, and can use a SPI protocol, UART protocol, I2C protocol, SDIO protocol, or any other suitable protocol.

The control unit 64 can optionally include an image signal processing unit (ISP) 172 that functions to pre-process the camera signals (e.g., images) before passing to vision processing system and/or application processing system. The ISP 172 can process the signals from all cameras, the signals from the camera subset, or signals from any other suitable source. The ISP 172 can auto-white balance, correct field shading, rectify lens distortion (e.g., dewarp), crop, select a pixel subset, apply a Bayer transformation, demosaic, apply noise reduction, sharpen the image, or otherwise process the camera signals. For example, the ISP 172 can select the pixels associated with an overlapping physical region between two cameras from images of the respective streams (e.g., crop each image to only include pixels associated with the overlapping region shared between the cameras of a stereocamera pair). The ISP 172 can be a system on a chip with multi-core processor architecture, be an ASIC, have ARM architecture, be part of the vision processing system, be part of the application processing system, or be any other suitable processing system.

The omnidirectional depth sensing and obstacle avoidance system 32 can optionally include sensors 174 that function to sample signals indicative of system operation. The sensor output can be used to determine system kinematics, process the images (e.g., used in image stabilization), or otherwise used. The sensors 174 can be peripheral devices of the vision processing system 166, the application processing system 168, or of any other suitable processing system. The sensors 174 are typically statically mounted to the housing but can alternatively be mounted to the host robot or to any other suitable system. Sensors 174 can include: orientation sensors (e.g., IMU, gyroscope, accelerometer, altimeter, magnetometer), acoustic sensors (e.g., microphones, transducers), optical sensors (e.g., cameras, ambient light sensors), touch sensors (e.g., force sensors, capacitive touch sensor, resistive touch sensor), location sensors (e.g., GPS system, beacon system, trilateration system), or any other suitable set of sensors.

The omnidirectional depth sensing and obstacle avoidance system 32 can optionally include inputs (e.g., a keyboard, touchscreen, microphone, etc.), outputs (e.g., speakers, lights, screen, vibration mechanism, etc.), communication system (e.g., a WiFi module, BLE, cellular module, etc.), power storage (e.g., a battery), or any other suitable component.

Figure 20:
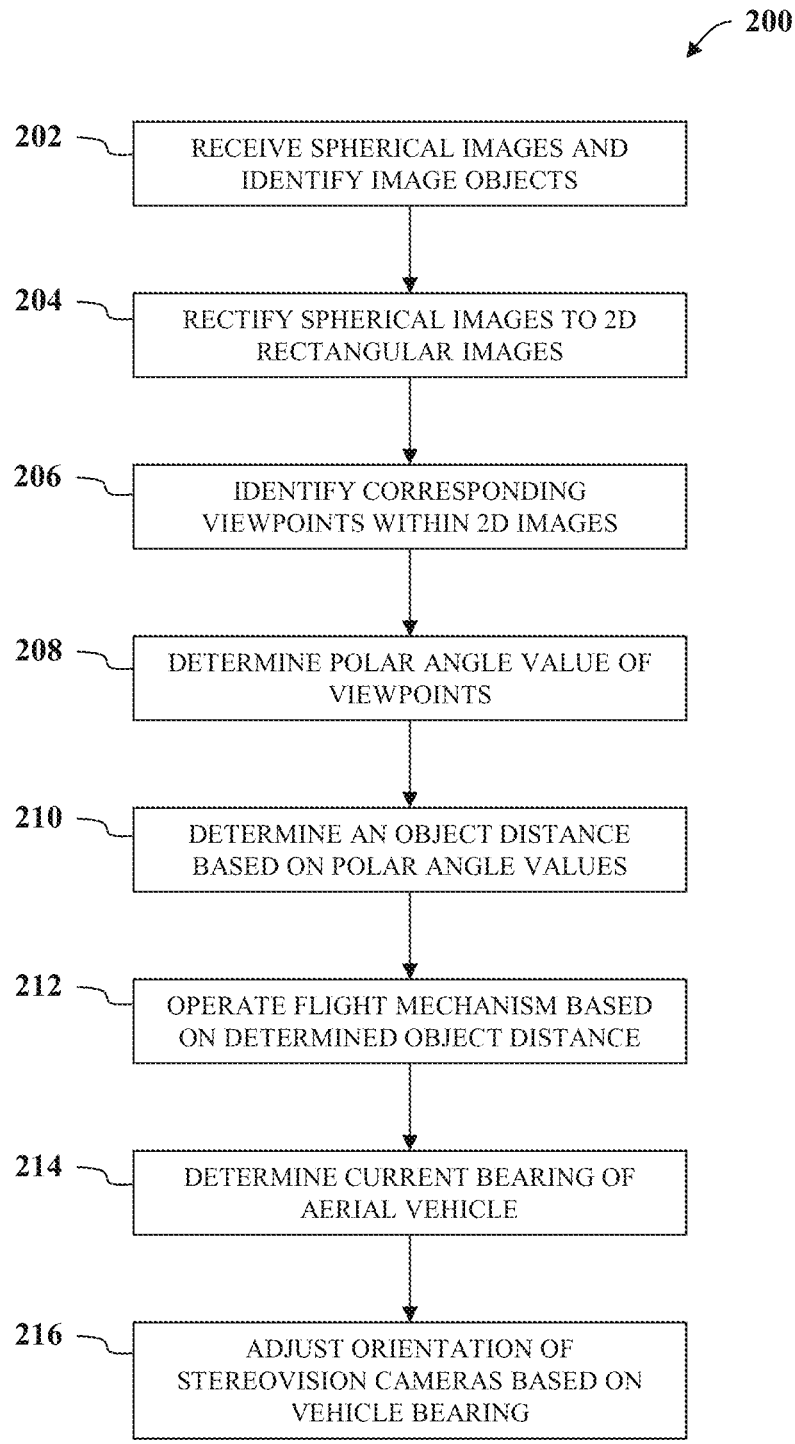
FIG. 20 is a flowchart illustrating an algorithm method implemented for operating an aerial vehicle including an omnidirectional depth sensing and obstacle avoidance system, according to an embodiment of the present invention.

FIG. 20 illustrates an algorithm method 200 that may be implemented by the processors of the control unit 64 of the omnidirectional depth sensing and obstacle avoidance system 32 and/or the processors of the processing system 22 of the aerial vehicle 12 to control the operation of the aerial vehicle 12. FIGS. 21-25 illustrate additional algorithms that may be used with algorithm 200. The algorithm method 200 includes a plurality of steps. Each method step may be performed independently of, or in combination with, other method steps. Portions of the method 200 may be performed by any one of, or any combination of, the components of the omnidirectional depth sensing and obstacle avoidance system 32 and/or the aerial vehicle 12.

In method step 202, the processor of the control unit 64 receives spherical video images from each of the stereovision cameras 80 and identifies a corresponding image object, P, in each of the received spherical video images. In method step 204, the processor rectifies each spherical video image onto a 2-dimensional (2D) rectangular image having an X-axis defined between 0 to $\pi$ and a Y-axis defined between $-\pi/2$ and $\pi/2$.

For example, relative to camera positions, two cameras 80 forming a stereovision pair typically must have part of the field of view overlapped. In order to obtain the 3D position (or depth information) from captured scene, the processor identifies where each surface point visible from one camera 80 is located in the other camera 80. Relative to calibration, the cameras 80 may be calibrated to obtain intrinsic parameters (focal length, principle point, skew coefficient, distortions, etc.) and extrinsic parameters (rotations and translations) between the two cameras 80 in the system.

Figure 21:
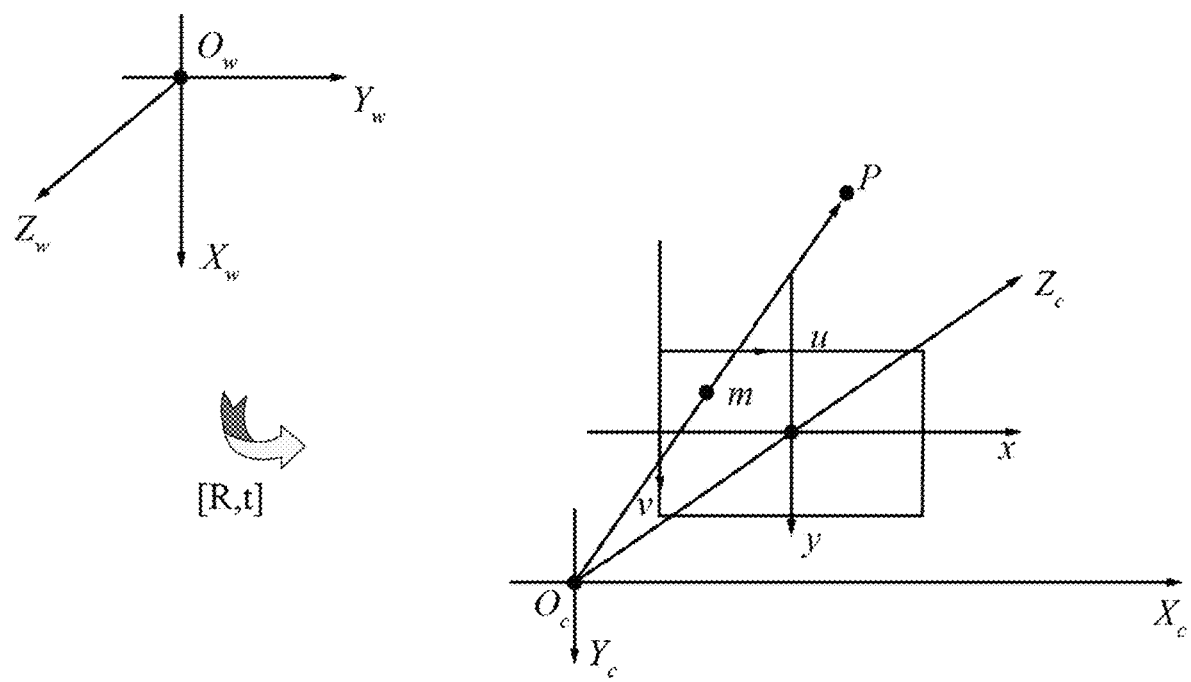
FIG. 21 illustrates a perspective camera pin hole model algorithm that may be used with the algorithm illustrated in FIG. 20, according to an embodiment of the present invention.

A perspective camera model is the most common model used for characterizing the intrinsic parameters of a perspective camera, e.g. as shown in FIG. 21. The model assumes a pin hole projection system. The image is formed by the intersection of the light rays from the objects through the center of the lens, to the focal plane. If it is assumed that $P(x_1, y_w, z_w)$ is an arbitrary scene point (surface point) in the world coordinates, and m(u, v) is its projection on the image plane measured in pixels, then mapping from the 3D world to the 2D image is given by the perspective projection equation:

$$z_c \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} R & t \\ 0^T & 1 \end{bmatrix} \begin{bmatrix} x_w \\ y_w \\ z_w \\ 1 \end{bmatrix} \qquad \text{Equation (3)}$$

where $f_x$ and $f_y$ are the focal lengths in x and y directions, $c_x$ and $c_y$ are the image coordinates of the projection center, s is the axis skew. The coordinate transformation can be expressed using the rotation matrix R (3×3) and the translation matrix t (3×1), and the intrinsic matrix of the camera 80 is defined as:

$$K = \begin{bmatrix} f_x & s & c_x \\ 0 & f_y & c_y \\ 0 & 0 & 1 \end{bmatrix} \qquad \text{Equation (4)}$$

Moreover, radial distortion can be modeled using a distortion correction model:

$$\hat{u} = u_{crd} + L(r)(u - u_{crd})$$

$$\hat{v} = v_{crd} + L(r)(v - v_{crd}) \qquad \text{Equation (5)}$$

where (u, v) are measured coordinates, (û, v̂) are the corrected coordinates, ($u_{crd}$, $v_{crd}$) is the center of radial distortion, and the function L(r) is only defined for positive values of r and L(0)=1. An approximation to an arbitrary function L(r) may be given by a Taylor expansion $$L(r) = 1 + \kappa_1 r + \kappa_2 r^2 + \kappa_3 r^3 + \qquad \text{Equation (6)}$$

where $[R_1|t_1]$ and $[R_2|t_2]$ stands for the transformation matrices of the stereovision camera pair 80; $X_{c1}$ and $X_{c2}$ stands for the local camera coordinates of point P. The processor may also obtain the relative transformation between the two cameras 80 as:

$$R = R_1 R_2^{-1}$$

$$t = t_1 - R_1 R_2^{-1} t_2 \qquad \text{Equation (7)}$$

Moreover, for an arbitrary scene point $P(x_w, y_w, z_w)$ or $P(X_w)$, the following may be utilized:

$$X_{c1} = [R_1|t_1] X_w$$

$$X_{c2} = [R_2|t_2] X_w$$

The most popular method uses a planar checkerboard-like pattern with the position of the squares on the board already known. To obtain the intrinsic and extrinsic parameters of the cameras 80, the processor may take multiple images of the checkerboard while rotating and moving the checkerboard, extract the corner positions of the checkerboard, and then perform an optimization step (for example, using a least-square minimization method) to determine the intrinsic matrix K and extrinsic parameters [R|t].

Figure 22:
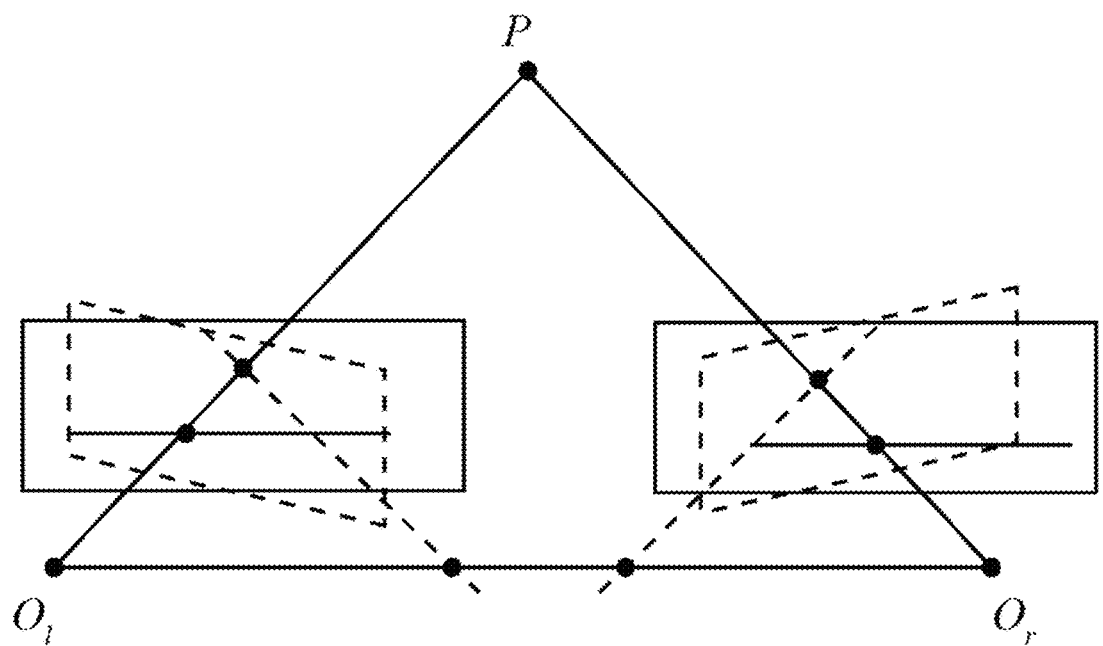
FIG. 22 illustrates a stereovision rectification algorithm that may be used with the algorithm illustrated in FIG. 20, according to an embodiment of the present invention.
Figure 23:
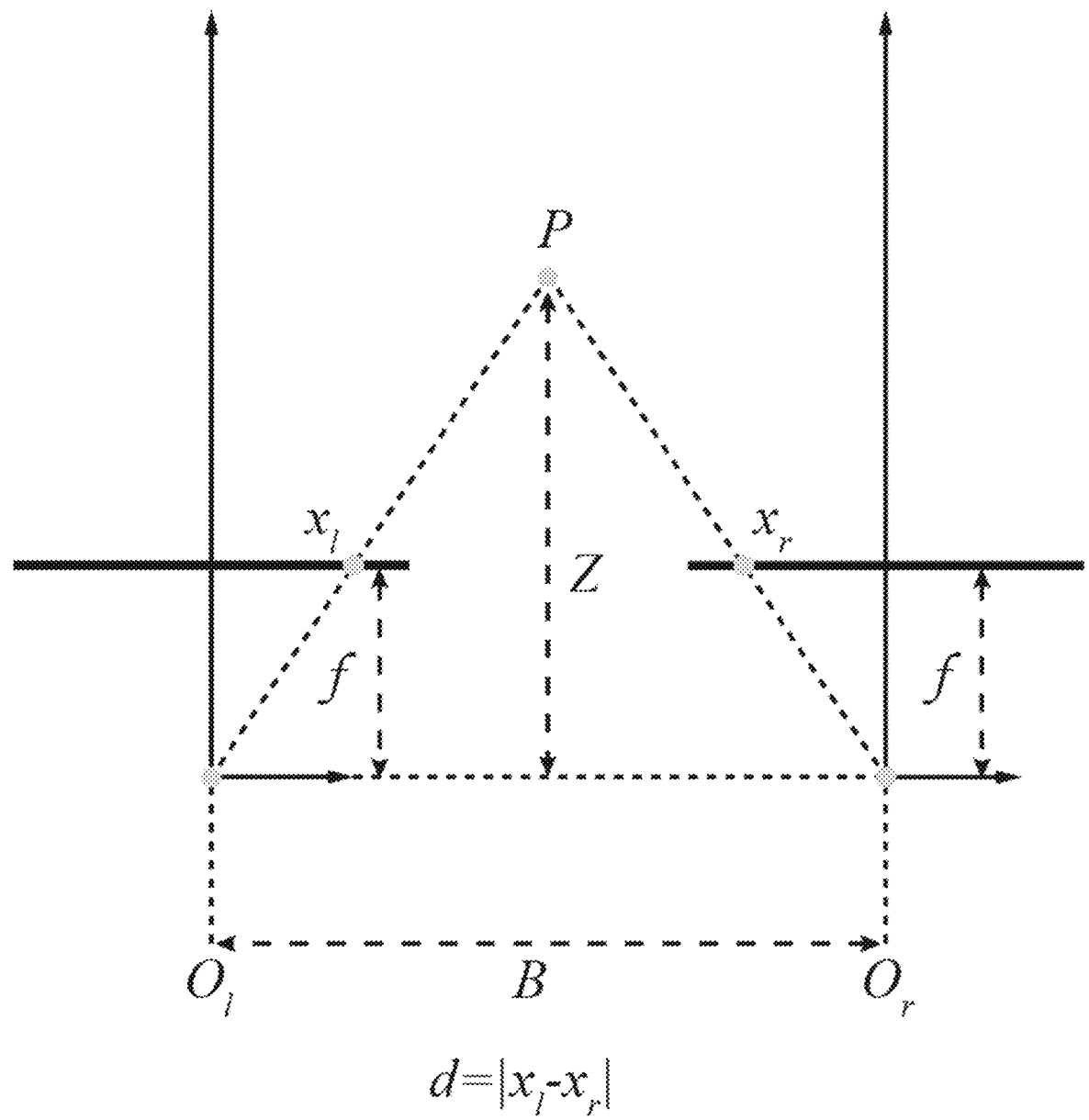
FIG. 23 illustrates a reprojection and depth calculation algorithm that may be used with the algorithm illustrated in FIG. 20, according to an embodiment of the present invention.

Relative to rectification, a single 2-D point and two camera centers define a plane in the 3-D space that intersect both images into two lines, called epipolar lines. In stereovision, an image rectification step is performed before doing stereo matching. By using the priori intrinsic and extrinsic parameters from the calibration step, an image pair is remapped into a new image pair where epipolar lines of the left and right images are horizontal and aligned to each other. This has the advantage of facilitating image correspondence search because the correspondence of one pixel in the left (right) image can be searched across those pixels in the right (left) image lying on the same row, e.g. as shown in FIG. 22. Relative to stereomatching, with rectified image pair, one can perform stereo matching methods for correspondence search. The methods can be categorized into two classes: local stereo matching (block matching, gradient-based optimization, feature matching, etc.) and global stereo matching (dynamic programming, intrinsic curves method, graph cuts, nonlinear diffusion, belief propagation, correspondenceless methods, etc.). Global methods are more complex and need more processing power than the local approach, but they require less texture on the surfaces and deliver more accurate results, especially at object boundaries. If a sufficiently good and unique match is found, one can associate the left image pixel with the corresponding right image pixel. The association is stored in the disparity map in terms of an offset between the pixels' x positions. Relative to reprojection and depth calculation, the disparity map of pixels between two images can allow for calculation of depth information for each pixel and its corresponding scene point in the 3D global coordinates. As shown in FIG. 23, a rectified left and right cameras have their projection centers at $O_l$ and $O_r$, the distance between the centers is called baseline B, focal length is f. The rectified projection image planes are parallel to each other, and also parallel to the baseline. The 3D space point P is projected onto the two images as $(x_1, y_1)$ and $(x_r, y_r)$. The disparity of point P in the stereo images is $d=|x_1-x_r|$. Using the principle of trigonometry, the depth of the point in 3D space can be obtained as: Z=fB/d. Also the x and y coordinates can also be obtained as:

$$X = \frac{f(x_l - c_x)}{d} \qquad \text{Equation (9)}$$

and $$Y = \frac{f(y_l - c_y)}{d} \qquad \text{Equation (10)}$$

Moreover, the calculations can be as shown in FIG. 23.

Figure 24:
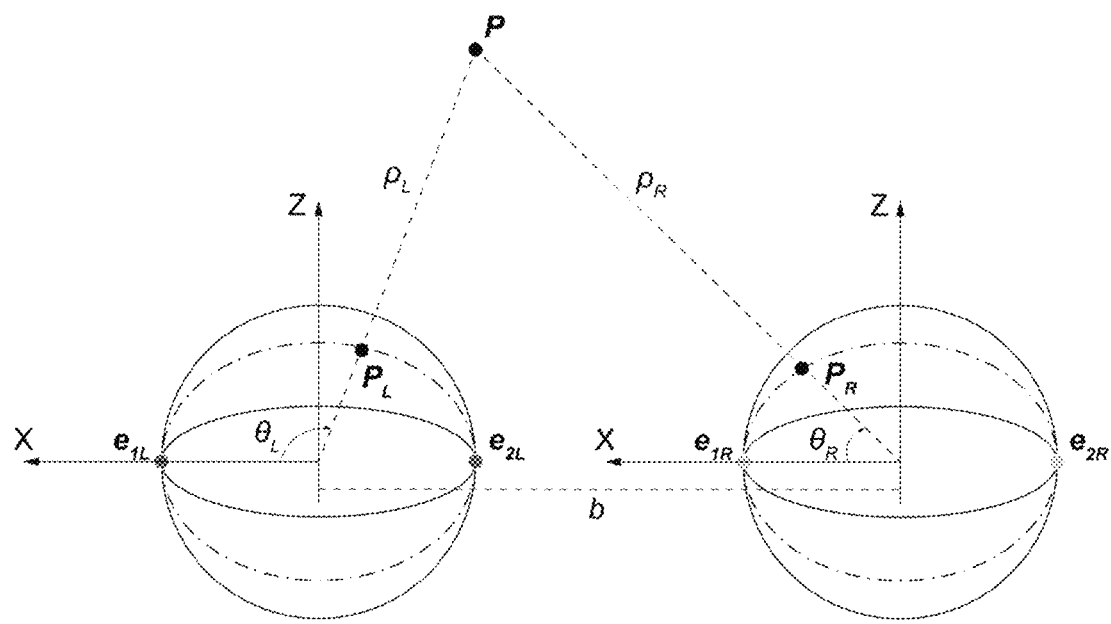
FIG. 24 illustrates a spherical model algorithm that may be used with the algorithm illustrated in FIG. 20, according to an embodiment of the present invention.

In this disclosure, the camera model can be a spherical model such that the way to define epipolar lines for rectification is different from what is described above. As shown in FIG. 24, each of the fisheye lens modules can be depicted as a spherical model. The Z axis aligns the optical axis of each fisheye module, and the X axis aligns the baseline of the stereovision pair of cameras 80. The baseline between the stereovision pair is b. For each of the fisheye module, there are two epipoles $e_1$ and $e_2$. The dash-dotted great circle stands for an epipolar line, the plane of which has an angle of φ with the X-Z plane. If an arbitrary point P in the space sits in this epipolar plane, the lines between the point P and the center of the spherical model (the single view point of the camera 80) intersect with the epipolar lines on each side at $P_L$ and $P_R$. The polar angles relative to the X axis are $\theta_L$ and $\theta_R$. And we define the distances between scene point P and single view point of the cameras as $\rho_L$ and $\rho_R$. By simple trigonometry, one can determine the length of $\rho_L$ and $\rho_R$ as:

$$\rho_L = b\frac{\sin(\theta_R)}{\sin(d)} = b\frac{\sin(\theta_L - d)}{\sin(d)} \qquad \text{Equation (11)}$$

$$\rho_R = b\frac{\sin(\pi - \theta_L)}{\sin(d)} = b\frac{\cos(\theta_R + d)}{\sin(d)}$$

where d is the normalized disparity, $d=\sigma_L-\sigma_R$, assuming the spherical image is normalized with the focal length of the spherical image (i.e. the radius of the great circle=1).

To adapt this method in a widely used stereovision depth sensing algorithm, a rectification step is performed, as described above. As shown in the FIG. 25, the spherical image can be remapped into a regular rectangle image. If the fisheye lens module has a diagonal field of view of 180 degrees, the rectified rectangle image can have X axis from 0 to π, and Y axis from −π/2 to π/2 (Φ)=π/2). The epipoles are stretched to lines. Since an equidistant fisheye lens module captures surrounding visual information in an angle uniform manner, the image after rectification maintains higher spatial resolution near the center columns, while the peripheral columns (near the epipoles) have reduced spatial resolution and thus low performance in stereo matching and depth sensing.

In the illustrated embodiment, the processor generates a first rectified 2D rectangular image 176 from the spherical video image received from the first stereovision camera 82, and generates a second rectified 2D rectangular image 178 from the spherical video image received from the second stereovision camera 84.

Figure 25:
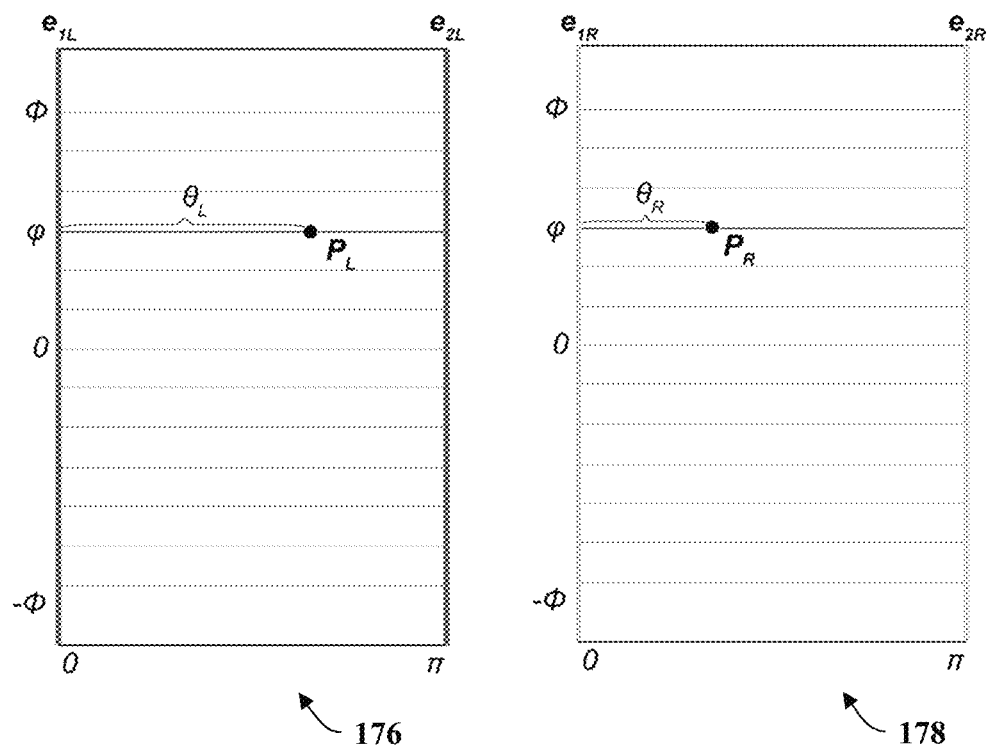
FIG. 25 illustrates a 2-dimensional rectification algorithm that may be used with the algorithm illustrated in FIG. 20, according to an embodiment of the present invention.

In method step 206, the processor identifies a view point within each rectified 2D rectangular image associated with the corresponding image object. For example, as shown in FIG. 25, the processor identifies view point $P_L$ in the first rectified 2D rectangular image 176 associated with the first stereovision camera 82, and identifies $P_R$ in the second rectified 2D rectangular image 178 associated with the second stereovision camera 84.

In method step 208, the processor determines a polar angle value $\sigma_L$ and $\sigma_R$ of each view point $P_L$ and $P_R$ along a corresponding X-axis of each rectified 2D rectangular image.

In method step 210, the processor then determines a distance of the corresponding image object, P, from the aerial vehicle 12 based on the determined polar angle values $\theta_L$ and $\theta_R$. For example, in one embodiment, the processor determines a distance of the corresponding image object, P, using Equation 11.

In method step 212, the processor operates the lift mechanisms 30 during a flight operation based on the determined distance of the corresponding image object P from the aerial vehicle 12.

In method step 214, the processor determines a current bearing direction 180 (shown in FIGS. 26A-26B) of the aerial vehicle 12 during the flight operation. For example, in one embodiment the control unit 64 may receive signals from the sensors and determines a current bearing direction 180 based on the received signals. In another embodiment, the processing system 22 determines the current bearing direction 180 of the aerial vehicle 12 and transmits the data to the control unit 64.

Figure 26A:
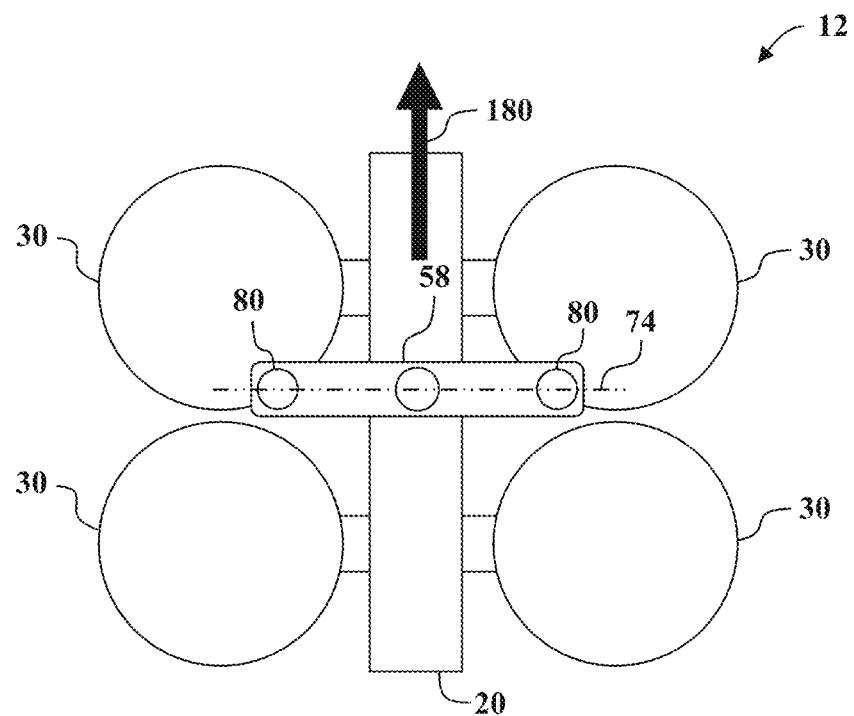
FIGS. 26A and 26B illustrate operation of the aerial vehicle during a flight operation using the algorithm illustrated in FIG. 20.
Figure 26B:
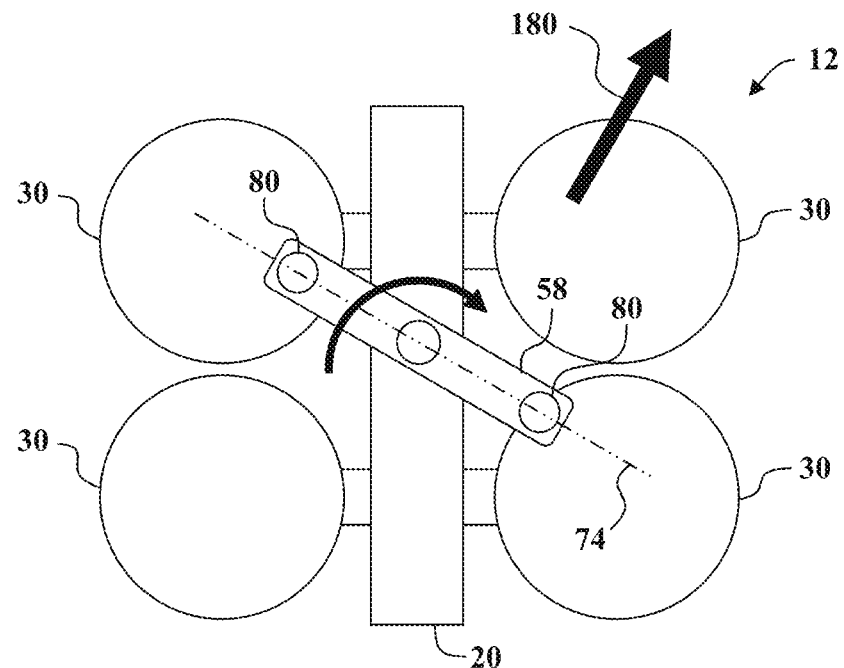
Figure 27:
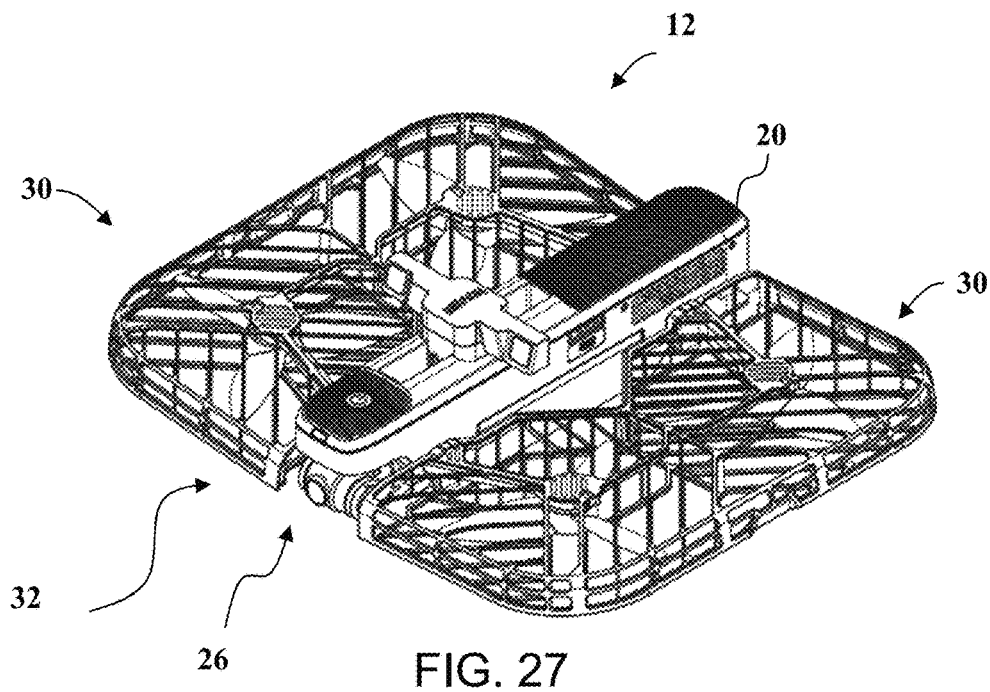
FIGS. 27-30 are various views of the aerial vehicle shown in FIG. 4, according to embodiments of the present invention.
Figure 28:
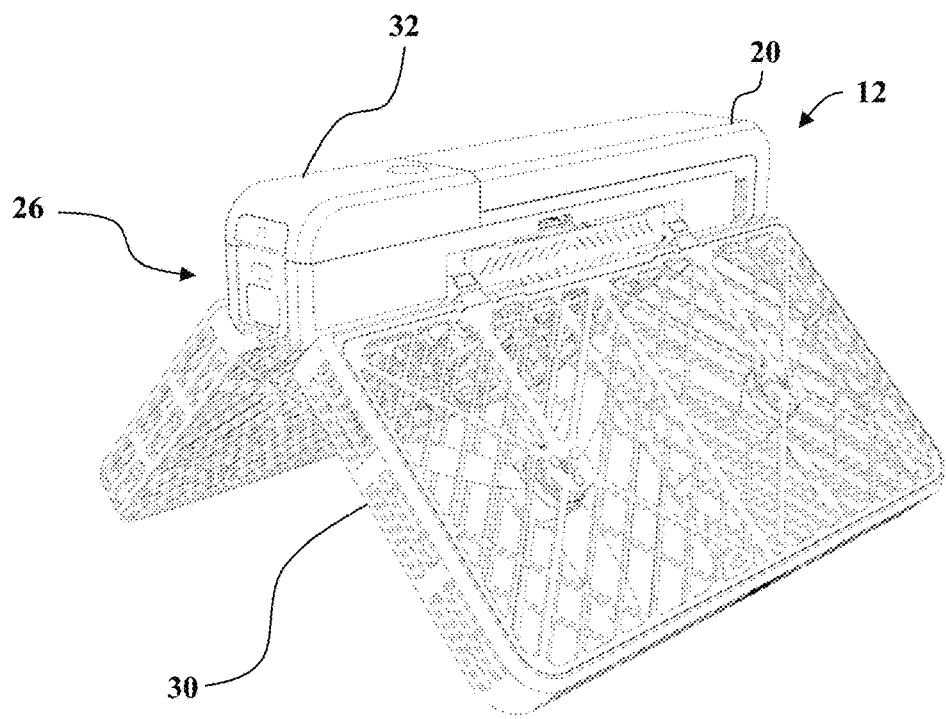
Figure 29:
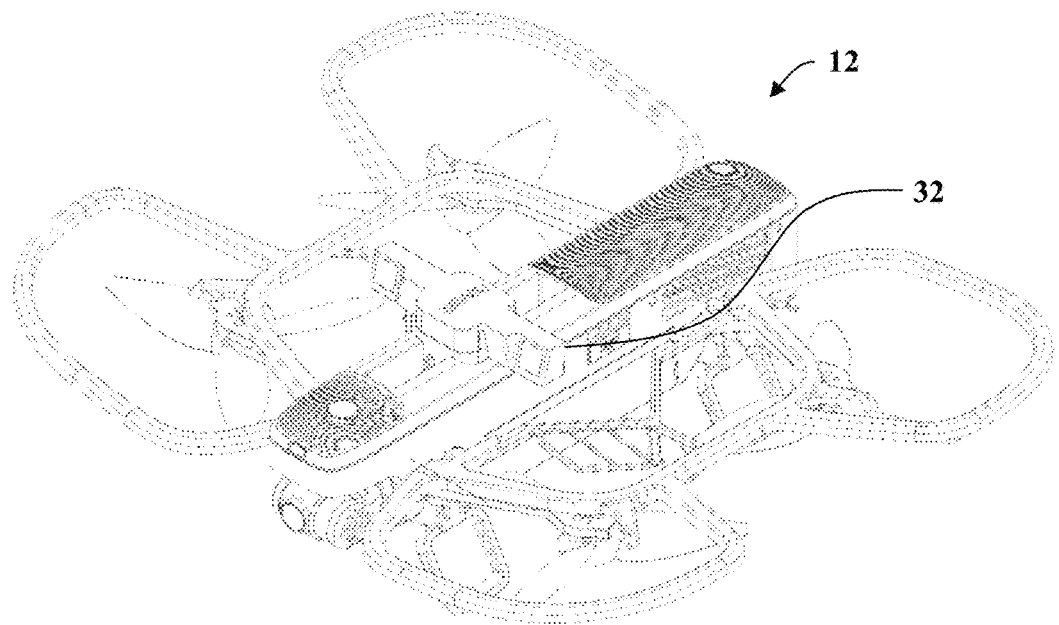
Figure 30:
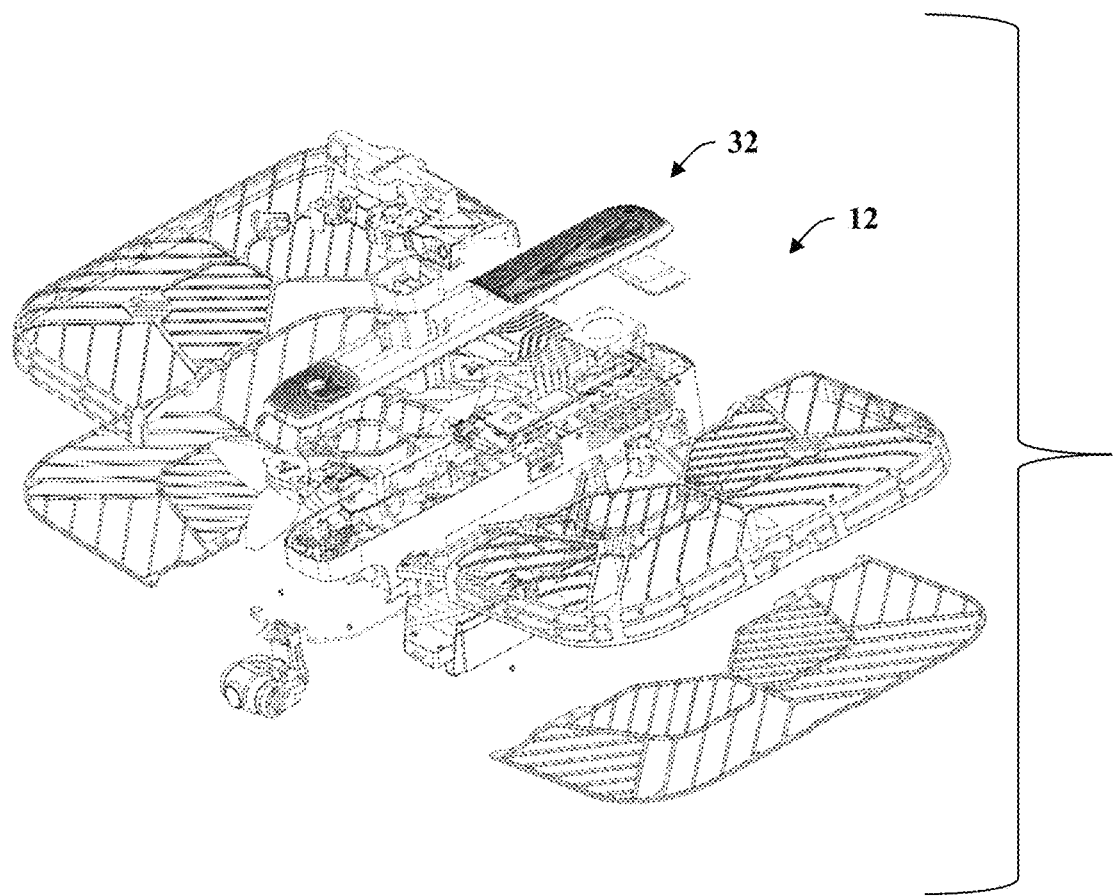

In method step 216, the processor of the control unit 64 operates the motor assembly 62 to rotate the platform assembly 58 to maintain an orientation of the longitudinal axis 74 of the platform assembly 58 perpendicular to the current bearing direction 180 (shown in FIG. 26B).

By applying spherical stereovision depth sensing algorithm, the depth information along the top hemisphere directions of aerial vehicle 12 can be obtained except for a small fraction of angles toward the ends of the stereovision pair modules since the resolution and accuracy near an epipole are low. The depth sensing module has the finest resolution and depth sensing accuracy towards the top direction, but also has sufficient enough performance for any direction vector along the normal plane to the baseline of the stereovision pair module. As the aerial vehicle 12 moves in a certain direction (typically a horizontal direction), the stereovision pair camera assembly 60 can rotate such that the baseline of the stereovision pair of cameras 80 is normal to the moving direction, as is shown in FIGS. 6A-6B.

In other embodiments, the omnidirectional depth sensing and obstacle avoidance system 32 may be used with a host robot that functions to traverse within a physical space. The host robot can additionally or alternatively receive remote control instructions and operate according to the remote control instructions. The host robot can additionally generate remote content or perform any other suitable functionality. The host robot can include one or more: communication modules, motive mechanisms, sensors, content-generation mechanisms, processing systems, reset mechanisms, or any other suitable set of components. The host robot can be a drone, vehicle, robot, security camera, or be any other suitable remote-controllable system. The motive mechanism can include a drivetrain, rotors, jets, treads, rotary joint, or any other suitable motive mechanism. The application processing system 168 is typically the host robot processing system, but can alternatively be connected to the host robot processing system or be otherwise related. In a specific example, the host robot includes an aerial vehicle (e.g., drone) with a WiFi module, a camera, and the application processing system. The system can be mounted to the top of the host robot (e.g., as determined based on a gravity vector during typical operation), the bottom of the host robot, the front of the host robot, centered within the host robot, or otherwise mounted to the host robot. The omnidirectional depth sensing and obstacle avoidance system 32 can be integrally formed with the host robot, removably coupled to the host robot, or otherwise attached to the host robot. One or more omnidirectional depth sensing and obstacle avoidance system 32 can be used with one or more host robots.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. An unmanned aerial vehicle comprising:
    a fuselage body;
    a lift mechanism coupled to the fuselage body; and
    a depth sensing and obstacle avoidance system coupled to the fuselage body, the depth sensing and obstacle avoidance system including:
    a platform assembly including a support member extending between a first end and an opposite second end along a longitudinal axis;
    a pair of stereovision cameras coupled to the platform assembly, each stereovision camera positioned at an opposite end of the support member; and
    a motor assembly coupled to the fuselage body and to the platform assembly for rotating the platform assembly with respect to the fuselage body about a rotational axis perpendicular to the longitudinal axis of the platform assembly.

2. The unmanned aerial vehicle of claim 1, wherein the motor assembly includes:
    a stator assembly;
    a rotor assembly rotatably coupled to the stator assembly, the rotor assembly including a rotor coupled to the platform assembly and a rotor shaft coupled to the rotor and to the stator assembly for rotating the rotor and platform assembly about the rotational axis; and
    a rotation limiting assembly coupled to the rotor assembly and to the stator assembly for limiting an angle of rotation of the rotor assembly about the rotational axis.

3. The unmanned aerial vehicle of claim 2, wherein the rotation limiting assembly includes:
    an arcuate slot defined along an outer surface of the stator assembly and extending between a first slot endwall and a second slot endwall; and
    a positioning assembly including a positioning member configured to travel within the arcuate slot, the positioning member travels towards the first slot endwall as the rotor assembly is rotated in a first rotational direction and contacts the first slot endwall to prevent additional rotation of the rotor assembly in the first rotational direction, and travels within the arcuate slot towards the second slot endwall as the rotor assembly is rotated in a second rotational direction and contacts the second slot endwall to prevent additional rotation of the rotor assembly in the second rotational direction.

4. The unmanned aerial vehicle of claim 3, wherein the positioning assembly includes:
    a first gear coupled to the rotor shaft such that a rotation of the rotor shaft rotates the first gear about the rotational axis;
    a support shaft extending outwardly from the outer surface of the stator assembly;
    a bearing rotatably coupled to the support shaft; and
    a second gear coupled to the bearing assembly for rotating with respect to the support shaft, the second gear coupled to the first gear such that a rotation of the first gear rotates the second gear about the support shaft;
    wherein the arcuate slot is defined around a perimeter of the support shaft, the positioning member includes a pin extending outwardly from an outer surface of the second gear and positioned within the arcuate slot to travel within the arcuate slot to contact the first slot endwall and the second slot endwall.

5. The unmanned aerial vehicle of claim 3, wherein the positioning assembly includes:
a first ring component coupled to the rotor shaft such that a rotation of the rotor shaft rotates the first ring component about the rotational axis, the first ring component including a positioning protrusion extending outwardly from an outer surface of the first ring component towards the stator assembly;
a second ring component coupled between the first ring component and the stator assembly, the second ring component including the positioning member including a positioning flange extending outwardly from a radially outer surface of the second ring component, the positioning flange orientated within the arcuate slot to travel within the arcuate slot of the stator assembly to contact the first slot endwall and the second slot endwall;
wherein the arcuate slot is defined around a perimeter of the outer surface of the stator assembly, the positioning protrusion is configured to contact the positioning flange as the first ring component is rotated by the rotor assembly to move the positioning flange along the arcuate slot.

6. The unmanned aerial vehicle of claim 5, wherein the first ring component includes a support member extending outwardly from the outer surface of the first ring component towards the stator assembly, the second ring component includes a radially inner surface contacting the support member to support the second ring component from the first ring component such that the first ring component is rotatable with respect to the second ring component.

7. The unmanned aerial vehicle of claim 1, wherein the pair of stereovision cameras include ultra-wide angle lens cameras having a viewing direction orientated parallel to the rotational axis and away from the fuselage body.

8. The unmanned aerial vehicle of claim 1, wherein the depth sensing and obstacle avoidance system includes a first pair of stereovision cameras mounted on a first side of the platform assembly and a second pair of stereovision camera mounted on an opposite second side of the platform assembly.

9. The unmanned aerial vehicle of claim 1, wherein the depth sensing and obstacle avoidance system includes a processor operatively coupled to the motor assembly, processor programmed to determine a current bearing direction of the aerial vehicle during a flight operation and operate the motor assembly to rotate the platform assembly to maintain an orientation of the longitudinal axis of the platform assembly perpendicular to the current bearing direction.

10. The unmanned aerial vehicle of claim 9, wherein the depth sensing and obstacle avoidance system includes:
the processor mounted on printed circuit board positioned within the fuselage body; and
a flexible printed circuit coupled between the printed circuit board and the pair of stereovision cameras and coiled about a center mounting arm of the platform assembly.

11. The unmanned aerial vehicle of claim 9, wherein the processor is operatively coupled to the lift mechanism and programmed to:
receive spherical video images from each of the stereovision cameras;
identify a corresponding image object in each of the received spherical video images;
rectify each spherical video image onto a 2-dimensional (2D) rectangular image having an X-axis defined between 0 to $\pi$ and a Y-axis defined between $-\pi/2$ and $\pi/2$;
identify a view point within each rectified 2D rectangular image associated with the corresponding image object;
determine a polar angle value of each view point along a corresponding X-axis of each rectified 2D rectangular image;
determine an distance of the corresponding image object from the aerial vehicle based on the determined polar angle values; and
operate the lift mechanism based on the determined distance of the corresponding image object from the aerial vehicle.

12. A depth sensing and obstacle avoidance system for use with an unmanned aerial vehicle, the aerial vehicle including a fuselage body and a lift mechanism coupled to the fuselage body, the depth sensing and obstacle avoidance system including:
a platform assembly including a support member extending between a first end and an opposite second end along a longitudinal axis;
a pair of stereovision cameras coupled to the platform assembly, each stereovision camera positioned at an opposite end of the support member; and
a motor assembly coupled to the fuselage body and to the platform assembly for rotating the platform assembly with respect to the fuselage body about a rotational axis perpendicular to the longitudinal axis of the platform assembly.

13. The depth sensing and obstacle avoidance system of claim 12, wherein the motor assembly includes:
a stator assembly;
a rotor assembly rotatably coupled to the stator assembly, the rotor assembly including a rotor coupled to the platform assembly and a rotor shaft coupled to the rotor and to the stator assembly for rotating the rotor and platform assembly about the rotational axis; and
a rotation limiting assembly coupled to the rotor assembly and to the stator assembly for limiting an angle of rotation of the rotor assembly about the rotational axis.

14. The depth sensing and obstacle avoidance system of claim 13, wherein the rotation limiting assembly includes:
an arcuate slot defined along an outer surface of the stator assembly and extending between a first slot endwall and a second slot endwall; and
a positioning assembly including a positioning member configured to travel within the arcuate slot, the positioning member travels towards the first slot endwall as the rotor assembly is rotated in a first rotational direction and contacts the first slot endwall to prevent additional rotation of the rotor assembly in the first rotational direction, and travels within the arcuate slot towards the second slot endwall as the rotor assembly is rotated in a second rotational direction and contacts the second slot endwall to prevent additional rotation of the rotor assembly in the second rotational direction.

15. The depth sensing and obstacle avoidance system of claim 14, wherein the positioning assembly includes:
a first gear coupled to the rotor shaft such that a rotation of the rotor shaft rotates the first gear about the rotational axis;
a support shaft extending outwardly from the outer surface of the stator assembly;

a bearing rotatably coupled to the support shaft; and
a second gear coupled to the bearing assembly for rotating with respect to the support shaft, the second gear coupled to the first gear such that a rotation of the first gear rotates the second gear about the support shaft;
wherein the arcuate slot is defined around a perimeter of the support shaft, the positioning member includes a pin extending outwardly from an outer surface of the second gear and positioned within the arcuate slot to travel within the arcuate slot to contact the first slot endwall and the second slot endwall.

16. The depth sensing and obstacle avoidance system of claim 14, wherein the positioning assembly includes:
a first ring component coupled to the rotor shaft such that a rotation of the rotor shaft rotates the first ring component about the rotational axis, the first ring component including a positioning protrusion extending outwardly from an outer surface of the first ring component towards the stator assembly;
a second ring component coupled between the first ring component and the stator assembly, the second ring component including the positioning member including a positioning flange extending outwardly from a radially outer surface of the second ring component, the positioning flange orientated within the arcuate slot to travel within the arcuate slot of the stator assembly to contact the first slot endwall and the second slot endwall;
wherein the arcuate slot is defined around a perimeter of the outer surface of the stator assembly, the positioning protrusion is configured to contact the positioning flange as the first ring component is rotated by the rotor assembly to move the positioning flange along the arcuate slot.

17. The depth sensing and obstacle avoidance system of claim 16, wherein the first ring component includes a support member extending outwardly from the outer surface of the first ring component towards the stator assembly, the second ring component includes a radially inner surface contacting the support member to support the second ring component from the first ring component such that the first ring component is rotatable with respect to the second ring component.

18. The depth sensing and obstacle avoidance system of claim 12, wherein the depth sensing and obstacle avoidance system includes:
a processor operatively coupled to the motor assembly and mounted on a printed circuit board positioned within the fuselage body; and
a flexible printed circuit coupled between the printed circuit board and the pair of stereovision cameras and coiled about a center mounting arm of the platform assembly;
wherein the processor programmed to determine a current bearing direction of the aerial vehicle during a flight operation and operate the motor assembly to rotate the platform assembly to maintain an orientation of the longitudinal axis of the platform assembly perpendicular to the current bearing direction.

19. The depth sensing and obstacle avoidance system of claim 18, wherein the processor is operatively coupled to the lift mechanism and programmed to:
receive spherical video images from each of the stereovision cameras;
identify a corresponding image object in each of the received spherical video images;
rectify each spherical video image onto a 2-dimensional (2D) rectangular image having an X-axis defined between 0 to $\pi$ and a Y-axis defined between $-\pi/2$ and $\pi/2$;
identify a view point within each rectified 2D rectangular image associated with the corresponding image object;
determine a polar angle value of each view point along a corresponding X-axis of each rectified 2D rectangular image;
determine an distance of the corresponding image object from the aerial vehicle based on the determined polar angle values; and
operate the lift mechanism based on the determined distance of the corresponding image object from the aerial vehicle.

20. A method of operating an aerial vehicle including a fuselage body, a lift mechanism coupled to the fuselage body, and a depth sensing and obstacle avoidance system, the depth sensing and obstacle avoidance system including a platform assembly including a support member extending between a first end and an opposite second end along a longitudinal axis, a pair of stereovision cameras coupled to a platform assembly, each stereovision camera positioned at an opposite end of the support member, and a motor assembly coupled to the fuselage body and to the platform assembly for rotating the platform assembly with respect to the fuselage body about a rotational axis perpendicular to the longitudinal axis of the platform assembly, and a processor, the method including the processor performing the steps of:
receiving spherical video images from each of the stereovision cameras;
identifying a corresponding image object in each of the received spherical video images;
rectifying each spherical video image onto a 2-dimensional (2D) rectangular image having an X-axis defined between 0 to $\pi$ and a Y-axis defined between $-\pi/2$ and $\pi/2$;
identifying a view point within each rectified 2D rectangular image associated with the corresponding image object;
determining a polar angle value of each view point along a corresponding X-axis of each rectified 2D rectangular image;
determining a distance of the corresponding image object from the aerial vehicle based on the determined polar angle values;
operating the lift mechanism during a flight operation based on the determined distance of the corresponding image object from the aerial vehicle;
determining a current bearing direction of the aerial vehicle during the flight operation; and
operating the motor assembly to rotate the platform assembly to maintain an orientation of the longitudinal axis of the platform assembly perpendicular to the current bearing direction.

* * * * *